US011438527B2

(12) United States Patent
Mao

(10) Patent No.: US 11,438,527 B2
(45) Date of Patent: Sep. 6, 2022

(54) SYSTEMS AND METHODS FOR DISPLAYING OBJECT BOX IN A VIDEO

(71) Applicant: ZHEJIANG DAHUA TECHNOLOGY CO., LTD., Zhejiang (CN)

(72) Inventor: Baoyu Mao, Hangzhou (CN)

(73) Assignee: ZHEJIANG DAHUA TECHNOLOGY CO., LTD., Hangzhou (CN)

(*) Notice: Subject to any disclaimer, the term of this patent is extended or adjusted under 35 U.S.C. 154(b) by 0 days.

(21) Appl. No.: 17/105,478

(22) Filed: Nov. 25, 2020

(65) Prior Publication Data
US 2021/0084240 A1 Mar. 18, 2021

Related U.S. Application Data

(63) Continuation of application No. PCT/CN2019/089977, filed on Jun. 4, 2019.

(30) Foreign Application Priority Data

Jun. 6, 2018 (CN) .......................... 201810575791.9

(51) Int. Cl.
*H04N 5/272* (2006.01)
*G06T 7/73* (2017.01)
(Continued)

(52) U.S. Cl.
CPC .............. *H04N 5/272* (2013.01); *G06T 7/73* (2017.01); *G06V 20/52* (2022.01); *H04N 7/18* (2013.01);
(Continued)

(58) Field of Classification Search
CPC .......... H04N 5/272; H04N 7/18; H04N 7/183; G06T 7/73; G06T 2207/10016;
(Continued)

(56) References Cited

U.S. PATENT DOCUMENTS 7,095,786 B1    8/2006  Schonfeld et al.
10,812,778 B1 * 10/2020 Wang ................. G01B 11/2504
(Continued)

FOREIGN PATENT DOCUMENTS

CN    101159862 A    4/2008
CN    102104775 A    6/2011
(Continued)

OTHER PUBLICATIONS

International Search Report in PCT/CN2019/089977 dated Aug. 16, 2019, 4 pages.
(Continued)

*Primary Examiner* — Nasim N Nirjhar
(74) *Attorney, Agent, or Firm* — Metis IP LLC

(57) ABSTRACT

A system and method for rendering an object box of an object in an image is provided in the present disclosure. The method includes obtaining a plurality of images, in a temporal sequence, each of the plurality of images relating to an object. The method also includes obtaining a first processed image by performing a smart algorithm analysis on a first image in the plurality of images, the smart algorithm analysis including identifying the object in the first image and determining a first coordinate of the object in the first image. The method further includes determining a first pixel distance between the object in two adjacent images in the plurality of images and rendering an object box for the object in each of the plurality of images for display based on the first coordinate of the object in the first image and the first pixel distance.

16 Claims, 13 Drawing Sheets

(51) Int. Cl.
*H04N 7/18* (2006.01)
*G06V 20/52* (2022.01)

(52) U.S. Cl.
CPC ............ *G06T 2207/10016* (2013.01); *G06T 2207/20084* (2013.01); *G06T 2207/30232* (2013.01)

(58) Field of Classification Search
CPC .......... G06T 2207/20084; G06T 2207/30232; G06K 9/00771; G06K 2209/21; G06K 9/4604; G06K 9/6271; G06K 9/3233; G01V 5/0016; G01V 9/00
See application file for complete search history.

(56) References Cited

U.S. PATENT DOCUMENTS

| | | | |
|---|---|---|---|
| 2005/0111618 | A1 | 5/2005 | Sommer, Jr. et al. |
| 2008/0253653 | A1* | 10/2008 | Gable ................. G01V 5/0008 382/173 |
| 2012/0238254 | A1 | 9/2012 | Yankovich et al. |
| 2015/0178320 | A1 | 6/2015 | Gao et al. |
| 2017/0124704 | A1* | 5/2017 | Wu ........................... G06T 7/80 |

FOREIGN PATENT DOCUMENTS

| | | | | |
|---|---|---|---|---|
| CN | 103345371 | A | 10/2013 | |
| CN | 106202317 | A | 12/2016 | |
| CN | 106358004 | A | 1/2017 | |
| CN | 107786748 | A | 3/2018 | |
| WO | WO-2014207675 | A1 * | 12/2014 | .............. G01J 3/501 |
| WO | WO-2018165753 | A1 * | 9/2018 | ........... G06N 3/0454 |
| WO | 2019233410 | A1 | 12/2019 | |

OTHER PUBLICATIONS

Written Opinion in PCT/CN2019/089977 dated Aug. 16, 2019, 5 pages.

First Office Action in Chinese Application No. 201810575791.9 dated Jul. 3, 2019, 16 pages.

Ma, Yan, Research on Motion Compensated Frame Interpolation in Frame Rate Conversion Applications, Chinese Outstanding Master's Thesis Full-text Database Information Section Series, 2014, 59 pages.

A. Denker et al., Vision-controlled Robotic Tracking and Acquisition, Intelligent Robots and Systems '94. 'Advanced Robotic Systems and the Real World', IROS '94. Proceedings of the IEEE/RSJ/GI International Conference on, 3: 2000-2006, 1994.

Samet Akcay et al., Using Deep Convolutional Neural Network Architectures for Object Classification and Detection Within X-Ray Baggage Security Imagery, IEEE Transactions on J Information Forensics and Security, 13(9): 2203-2215, 2018.

The Extended European Search Report in European Application No. 19816128.3 dated Jul. 7, 2021, 9 pages.

* cited by examiner

SYSTEMS AND METHODS FOR DISPLAYING OBJECT BOX IN A VIDEO

CROSS REFERENCE

This application is a continuation application of International Application No. PCT/CN2019/089977, filed on Jun. 4, 2019, which claims priority of Chinese Patent Application No. 201810575791.9 filed on Jun. 6, 2018, the entire contents of each of which are hereby incorporated by reference.

TECHNICAL FIELD

This disclosure generally relates to methods and systems for image processing, and more particularly, to methods and systems for smoothly displaying object boxes in one or more images in a video.

BACKGROUND

Nowadays, crowded places such as subway or railway stations are often equipped with security screening equipment, usually positioned at the entrances to carry out safety inspections on various objects carried by people. While conducting safety inspections, the security screening equipment captures a plurality of images in a temporal sequence, usually in the form of a video, and display the plurality of images in the temporal sequence including various objects, sometimes with object boxes for specific objects (e.g., something dangerous) on a display screen of the security screening equipment, so that the security staff can timely determine whether there is a prohibited object. In order to smoothly display the object boxes, each image of the plurality of images captured by the security screening equipment should be processed and analyzed to identify the specific objects. However, this would increase the burden of the processors and decrease the processing efficiency. If only a part of the plurality of images are processed and the rendering the object boxes in the part of the plurality of images, the display is often not smooth, showing glitches or mismatching the object box with the object, and making it more difficult for identification of dangerous objects. Thus, there is a need to smoothly display the objects with object boxes in the images captured during security screening with increased processing efficiency and decreased computing burden of the processor.

SUMMARY

Embodiments of the present disclosure provide a method, a system, and a computer readable storage medium for rendering an object box of an object in an image. Specifically, it may include the following aspects.

In a first aspect, the present disclosure discloses a system. The system may include at least one storage medium including a set of instructions and at least one processor in communication with the at least one storage medium, wherein when executing the set of instructions, the at least one processor may effectuate operations including obtaining a plurality of images, in a temporal sequence, each of the plurality of images relating to an object. The operations may also include obtaining a first processed image by performing a smart algorithm analysis on a first image in the plurality of images, the smart algorithm analysis including identifying the object in the first image and determining a first coordinate of the object in the first image. The operations may further include determining a first pixel distance between the object in two adjacent images in the plurality of images, and rendering an object box for the object in each of the plurality of images for display based on the first coordinate of the object in the first image and the first pixel distance.

In some embodiments, the system may also include an image capture device, wherein the plurality of images are obtained from a video captured by the image capture device.

In some embodiments, the operations may also include determining an imaging range of the image capture device and a size of the image, and determining a pixel size of the image based on the imaging range and the size of the image. The operations may include determining a time interval of the two adjacent images based on a first frame rate of the video, and determining a moving distance of the object located on a conveyor belt based on the time interval and a speed of the conveyor belt. The operations may further include determining the first pixel distance based on the moving distance and the pixel size.

In some embodiments, the operations may also include acquiring a second image from the plurality of images, wherein there is one or more images between the first image and the second image, and determining a second processed image by perform the smart algorithm analysis on the second image. The operations may include determining a second pixel distance between the object in the first image and the object in the second image based on the first coordinate of the object in the first image and a second coordinate of the object in the second image, and determining a number count of the one or more images between the first image and the second image. The operations may further include determining the first pixel distance based on the second pixel distance and the number count of the one or more images between the first image and the second image.

In some embodiments, the number count of the one or more images between the first image and the second image is determined based on a first frame rate of the video and a second frame rate of processed image, wherein the first frame rate and the second frame rate may be preset by a user.

In some embodiments, the operations may also include determining a third coordinate of the object in each of the one or more images between the first image and the second image based on the first coordinate of the object in the first image and the first pixel distance, and rendering an object box in the first image based on the first coordinate of the object in the first image. The operations may further include rendering an object box in each of the one or more images between the first image and the second image based on the third coordinate, and rendering an object box in the second image based on the second coordinate of the object in the second image.

In some embodiments, the operations may also include determining a fourth coordinate of the object in each of the plurality of images other than the first image based on the first coordinate of the object in the first image and the first pixel distance, and rendering an object box in the first image based on the first coordinate of the object in the first image. The operations may further include rendering an object box in each of the plurality of images other than the first image based on the fourth coordinate of the object.

In some embodiments, a shape of the object box may include one of rectangle, square, triangle, circle, oval, or irregular shape.

In some embodiments, a shape of the object box may include a contour of the object.

In some embodiments, the smart algorithm analysis may include a convolutional neutral network (CNN), Region-based Convolutional Network (R-CNN), Spatial Pyramid Pooling Network (SPP-Net), Fast Region-based Convolutional Network (Fast R-CNN), Faster Region-based Convolutional Network (Faster R-CNN).

In some embodiments, the system may also include a screen configured to display the plurality of images and the object box in each of the plurality of images in the temporal sequence.

In some embodiments, the screen may display the plurality of images and the object box according to a third frame rate.

In a second aspect, the present disclosure discloses a process. The process may include obtaining a plurality of images, in a temporal sequence, each of the plurality of images relating to an object. The process may also include obtaining a first processed image by performing a smart algorithm analysis on a first image in the plurality of images, the smart algorithm analysis including identifying the object in the first image and determining a first coordinate of the object in the first image. The process may further include determining a first pixel distance between the object in two adjacent images in the plurality of images, and rendering an object box for the object in each of the plurality of images for display based on the first coordinate of the object in the first image and the first pixel distance.

In a third aspect, the present disclosure discloses a non-transitory computer readable medium storing instructions, the instructions, when executed by a computing device including at least one processor, causing the computing device to implement a process. The process may include obtaining a plurality of images, in a temporal sequence, each of the plurality of images relating to an object. The process may also include obtaining a first processed image by performing a smart algorithm analysis on a first image in the plurality of images, the smart algorithm analysis including identifying the object in the first image and determining a first coordinate of the object in the first image. The process may further include determining a first pixel distance between the object in two adjacent images in the plurality of images, and rendering an object box for the object in each of the plurality of images for display based on the first coordinate of the object in the first image and the first pixel distance.

In a fourth aspect, the present disclosure discloses a system including at least one processor and a storage device. The system may include an acquisition unit configured to obtain a plurality of images, in a temporal sequence, each of the plurality of images relating to an object. The system may also include an analysis unit configured to obtain a first processed image by performing a smart algorithm analysis on a first image in the plurality of images, the smart algorithm analysis including identifying the object in the first image and determining a first coordinate of the object in the first image. The system may also include a distance determination unit configured to determine a first pixel distance between the object in two adjacent images in the plurality of images. The system may further include a rendering unit configured to render an object box for the object in each of the plurality of images for display based on the first coordinate of the object in the first image and the first pixel distance.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

Figure 1:
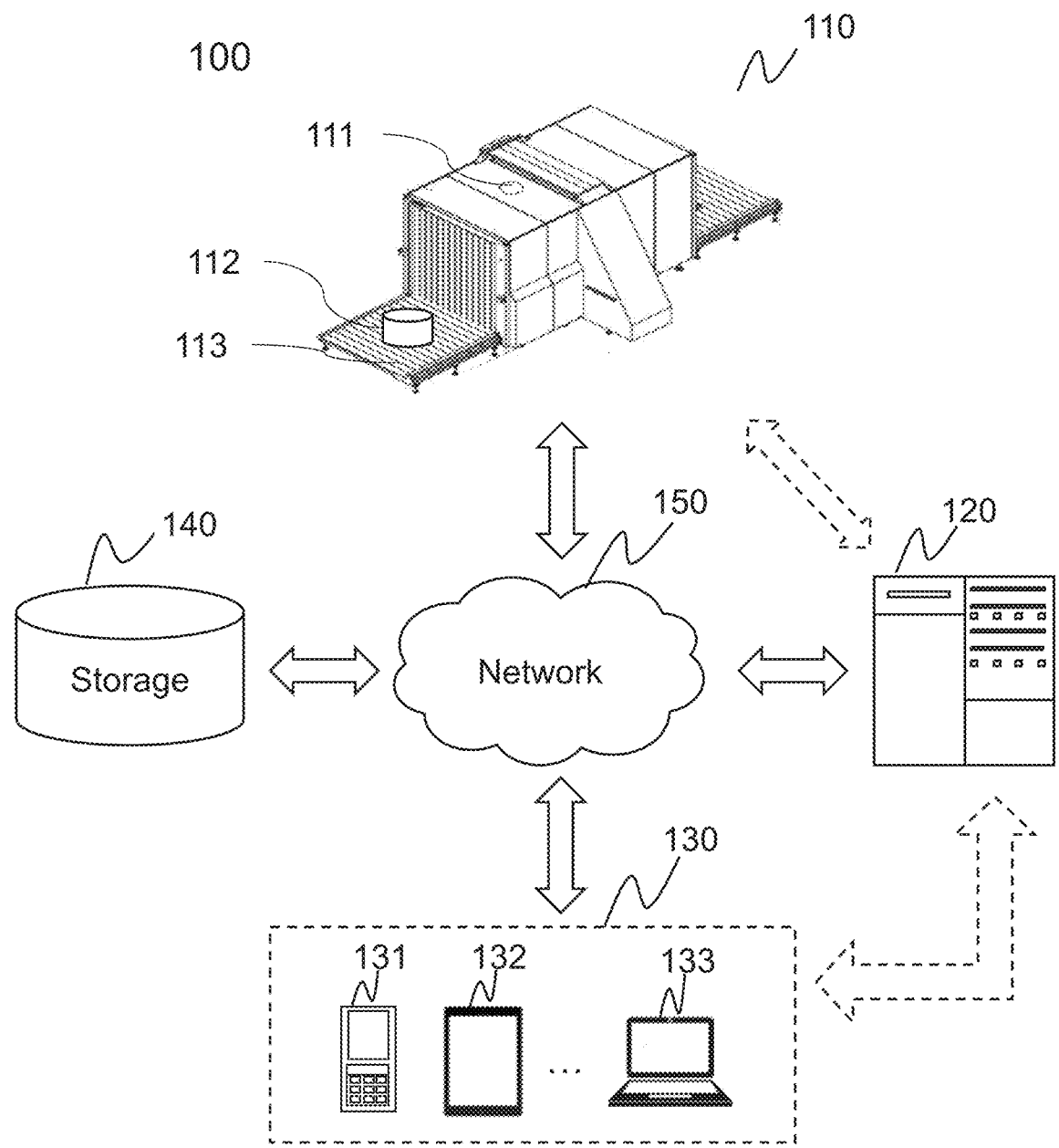
FIG. 1 is a schematic diagram illustrating an exemplary security screening system according to some embodiments of the present disclosure.

In order to illustrate the technical solutions related to the embodiments of the present disclosure, brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

As used in the disclosure and the appended claims, the singular forms, "an," and "the" include plural referents unless the content clearly dictates otherwise. It will be further understood that the terms "comprises," "comprising," "includes," and/or "including" when used in the disclosure, specify the presence of stated steps and elements, but do not preclude the presence or addition of one or more other steps and elements.

Some modules of the system may be referred to in various ways according to some embodiments of the present disclosure, however, any number of different modules may be used and operated in a client terminal and/or a server. These modules are intended to be illustrative, not intended to limit the scope of the present disclosure, Different modules may be used in different aspects of the system and method.

According to some embodiments of the present disclosure, flow charts are used to illustrate the operations performed by the system. It is to be expressly understood, the operations above or below may or may not be implemented in order. Conversely, the operations may be performed in inverted order, or simultaneously. Besides, one or more other operations may be added to the flowcharts, or one or more operations may be omitted from the flowchart.

An aspect of the present disclosure relates to systems and methods for smoothly rendering and/or displaying an object box of an object in an image in accordance with the image. The systems may obtain a plurality of images, in a temporal sequence, each of the plurality of images relating to an object. The systems may also obtain a first processed image by performing a smart algorithm analysis on a first image in the plurality of images, the smart algorithm analysis including identifying the object in the first image and determining a first coordinate of the object in the first image. The systems may further determine a first pixel distance between the object in two adjacent images in the plurality of images, and render the object box for the object in each of the plurality of images for display based on the first coordinate of the object in the first image and the first pixel distance.

FIG. 1 is a schematic diagram illustrating an exemplary security screening system 100 according to some embodiments of the present disclosure. The security screening system 100 may capture an image of an object and determine a coordinate of the object in the image. The security screening system 100 may further render an object box surrounding the object in the image and display the image and the object box together. As illustrated in FIG. 1, the security screening system 100 may include a security screening equipment 110, an image processing device 120, a terminal 130, a storage device 140, a network 150, and/or any other suitable component in accordance with various embodiments of the disclosure.

The security screening equipment 110 may include an image capture device and a conveyor belt 113. The image capture device may be configured to capture one or more images of an object 112 located on the conveyor belt 113. In some embodiments, the conveyor belt 113 may move and the image capture device may capture a plurality of images of the object 112 in a temporal sequence. The image capture device may include an optical camera, an infrared camera, an X-ray imaging device, a Computed Tomography (CT) imaging device, a Magnetic Resonance (MR) imaging device, etc. The optical camera may be a static camera, a pan-tilt-zoom camera, a moving camera, a stereoscopic camera, a structured light camera, a time-of-flight camera, etc. Specifically, the image capture device may be a camera equipped with a time-of-flight device, a Kinect sensor, a 3D laser scanner, a photographic scanner, etc. As used in this application, an image may be a still image, a video, a stream video, or a video frame obtained from a video. The image may be a 2D image or a 3D image.

In some embodiments, the image capture device may be an X-ray imaging device including an X-ray generator 111 and an X-ray detector panel (not shown in FIG. 1). The X-ray generator 111 and an X-ray detector panel may located on different side shell of the security screening equipment 110 opposite to each other. For example, the X-ray generator 111 may located on a top shell of the security screening equipment 110, and the X-ray detector panel may be located on a shell opposite to the X-ray generator 111, e.g., the X-ray detector panel may be located under the conveyor belt 113. The X-ray generator 111 may be configured to emit X-ray which go through the object 112 moving on the conveyor belt 113, and the X-ray detector panel including a plurality of X-ray detectors may be configured to detect the X-ray to obtain a plurality of images in a temporal sequence.

The plurality of images captured by the security screening equipment 110 may be stored in the storage device 140, and/or sent to the image processing device 120, or the terminal 130 via the network 150.

The image processing device 120 may be configured to allow one or more operators (e.g., a security staff) to set parameters to control the security screening equipment 110 and/or the image processing device 120.

The image processing device 120 may also be configured to process the image captured by the security screening equipment 110 or retrieved from another component in the security screening system 100 (e.g., the storage device 140, the terminal 130) to determine a processed image. For example, the image processing device 120 may identify an object in an image by perform smart algorithm analysis on the image and determine a coordinate of the object in the image. For another example, the image processing device 120 may determine a pixel distance between the object in two adjacent images of the plurality of images. Additionally, the image processing device 120 may render an object box surrounding the identified object and display the object box in accordance with the image.

In some embodiments, the image processing device 120 may include one or more processing engines (e.g., single-core processing engine(s) or mufti-core processor(s)). Merely by way of example, the image processing device 120 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof. Details of the image processing device 120 may be described in the present disclosure. See, e.g., FIG. 4 and the descriptions thereof.

The terminal 130 may be connected to or communicate with the image processing device 120 and/or the security screening equipment 110. The terminal 130 may allow one or more operators (e.g., a security staff) to control the production and/or display of the data (e.g., the image captured by the security screening equipment 110) on a display. For example, the operator may set a speed of the conveyor belt via the terminal 130 and may pause the move of the conveyor belt. The operator may set a first frame rate of the image captured by the security screening equipment 110. The operator may also set a second frame rate of the image processed by the image processing device 120 by performing a smart algorithm analysis via the terminal 130. The terminal 130 may include an input device, an output device, a control panel, a display (not shown in FIG. 1), or the like, or a combination thereof.

Exemplary input device may include a keyboard, a touch screen, a mouse, a remote controller, a wearable device, or the like, or a combination thereof. For example, the input device may include alphanumeric and other keys that may be inputted via a keyboard, a touch screen (e.g., with haptics or tactile feedback, etc.), a speech input, an eye tracking input, a brain monitoring system, or any other comparable input mechanism. The input information received through the input device may be communicated to the image processing device 120 via the network 150 for further processing. Exemplary input device may further include a cursor control device, such as a mouse, a trackball, or cursor direction keys to communicate direction information and command selections to, for example, the image processing device 120 and to control cursor movement on the screen or another display device.

The storage device 140 may store data and/or instructions. The data may include an image (e.g., an image obtained by the security screening equipment 110), relevant information of the image, etc. In some embodiments, the storage device 140 may store data and/or instructions that the image processing device 120 may execute or use to perform exemplary methods described in the present disclosure. In some embodiments, the storage device 140 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage device 140 may be implemented on a cloud platform, Merely by way of example, the cloud platform may include a private cloud, a public cloud, a hybrid cloud, a community cloud, a distributed cloud, an inter-cloud, a multi-cloud, or the like, or any combination thereof.

The network 150 may facilitate communications between various components of the security screening system 100. The network 150 may be a single network, or a combination of various networks. Merely by way of example, the network 150 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth™ network, a ZigBee™ network, a near field communication (NFC) network, a global system for mobile communications (GSM) network, a code-division multiple access (CDMA) network, a time-division multiple access (TDMA) network, a general packet radio service (CPRS) network, an enhanced data rate for GSM evolution (EDGE) network, a wideband code division multiple access (WCDMA) network, a high speed downlink packet access (HSDPA) network, a long term evolution (LTE) network, a user datagram protocol (UDP) network, a transmission control protocol/Internet protocol (TCP/IP) network, a short message service (SMS) network, a wireless application protocol (WAP) network, a ultra wide band (UWB) network, an infrared ray, or the like, or any combination thereof. The network 150 may also include various network access points, e.g., wired or wireless access points such as one or more base stations or Internet exchange points through which a data source may connect to the network 150 in order to transmit information via the network 150.

It should be noted that the descriptions above in relation to the security screening system 100 is provided for the purposes of illustration, and not intended to limit the scope of the present disclosure. For persons having ordinary skills in the art, various variations and modifications may be conducted under the guidance of the present disclosure. However, those variations and modifications do not depart the scope of the present disclosure. For example, part or all of the images generated by the security screening equipment 110 may be processed by the terminal 130. As another example, the security screening equipment 110 and the image processing device 120 may be implemented in one single device configured to perform the functions of the security screening equipment 110 and the image processing device 120 described in this disclosure. As still another example, the terminal 130, and the storage device 140 may be combined with or part of the image processing device 120 as a single device. Similar modifications should fall within the scope of the present disclosure.

Figure 2:
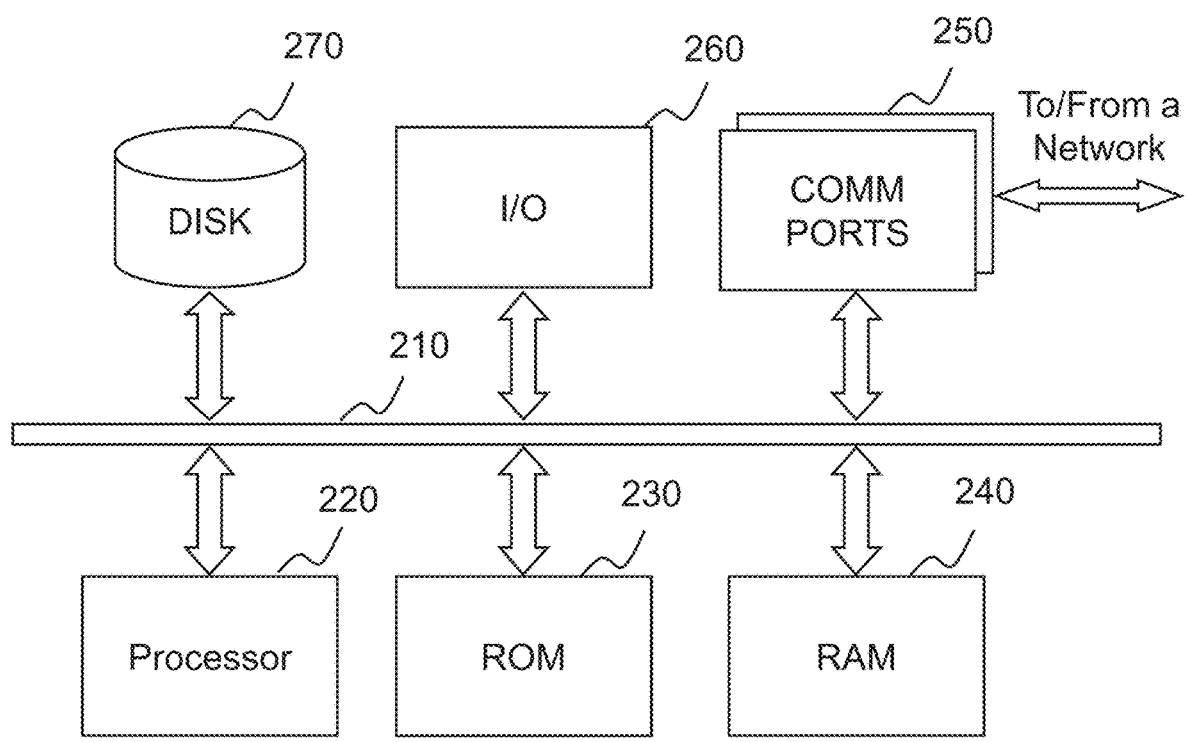
FIG. 2 is schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. The image processing device 120 and/or the terminal 130 may be implemented using one or more computing devices 200 and/or one or more portions of computing devices 200.

The computing device 200 may be used to implement any part of the data transmission as described herein. For example, the image processing device 120 may be implemented on the computing device 200, via its hardware, software program, firmware, or a combination thereof. Although only one such computing device 200 is shown, for convenience, the computing device 200 functions relating to the image processing as described herein may be implemented in a distributed fashion on a number of similar computing devices, to distribute the processing load.

The computing device 200, for example, may include COM ports 250 connected to and from a network connected thereto to facilitate data communications. The computing device 200 may also include a processor 220, in the form of one or more processors, for executing program instructions. The computing device 200 may include an internal communication bus 210, a program storage and data storage of different forms, such as, and a read only memory (ROM) 230, a random access memory (RAM) 240, or a disk 270, for various data files to be processed and/or transmitted by the computing device 200. The computing device 200 may also include program instructions stored in the ROM 230, RAM

240, and/or any other type of non-transitory storage medium to be executed by the processor 220. The methods and/or processes of the present disclosure may be implemented as the program instructions. The computing device 200 may also include an I/O component 260, supporting input/output between the computing device 200 and outside components. The computing device 200 may also receive programming and data via network communications.

The processor 220 may execute instructions and/or data to perform one or more functions described in the present disclosure. For example, the processor 220 may perform smart algorithm analysis on an image. In some embodiments, the processor 220 may include one or more processors (e.g., single-core processor(s) or multi-core processor(s)). Merely by way of example, the processor 220 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

Merely for illustration, only one processor 220 is described in the computing device 200. However, it should be noted that the computing device 200 in the present disclosure may also include multiple processors, thus operations and/or method steps that are performed by one processor 220 as described in the present disclosure may also be jointly or separately performed by the multiple CPUs/processors. For example, if in the present disclosure the processor 220 of the computing device 200 executes both step A and step B, it should be understood that step A and step B may also be performed by two different CPUs/processors jointly or separately in the computing device 200 (e.g., the first processor executes step A and the second processor executes step B, or the first and second processors jointly execute steps A and B).

The ROM 230, the RAM 240, and/or the disk 270 may store data and/or instructions that may perform one or more functions described in the present disclosure. For example, the ROM 230, the RAM 240, and/or the disk 270 may store instructions executed by the processor 220 to determine a coordinate of the object 112 in the image. As another example, the ROM 230, the RAM 240, and/or the disk 270 may store instructions executed by the processor 220 to render an object box. In some embodiments, the RAM 240 may include a dynamic RAM (DRAM), a double date rate synchronous dynamic RAM (DDR SDRAM), a static RAM (SRAM), a thyristor RAM (T-RAM), and a zero-capacitor RAM (Z-RAM), or the like, or any combination thereof. In some embodiments, the ROM 230 may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, or the like, or any combination thereof. In some embodiments, the disk 270 may include a magnetic disk, an optical disk, a solid-state drive, a flash drive, a floppy disk, an optical disk, a memory card, a zip disk, a magnetic tape, or the like, or any combination thereof. In some embodiments, the ROM 230, the RAM 240, and/or the disk 270 may include a data storage, an application, etc. In some embodiments, the data storage may be any hardware or software for storing data, including a circuitry, a program, etc. In some embodiments, the application may include any application that may be installed in the computing device 200 for querying data.

The I/O 260 may support an input/output between the computing device 200 and an outside component. Merely by way of example, the I/O 260 may include a display, a keypad/keyboard, or the like, or any combination thereof. The display may be an output device for presenting information in visual form. In some embodiments, the display may include a liquid crystal display (LCD) panel, a light emitting diode display (LED) panel, an organic light emitting diodes (OLED) panel, a cathode ray tube (CRT) display, a plasma display, a touchscreen, a simulated touchscreen, the like, or any combination thereof. The keypad/keyboard may be an input device for typing in information from a user. In some embodiments, the keypad/keyboard may include a standard alphanumeric keyboard, a simplified alphanumeric keyboard, a flexible keyboard, a handheld keyboard, a software keyboard, an on-screen keyboard, a laser projection keyboard, a sense board, or the like, or any combination thereof.

The COM ports 250 may be connected to a network to facilitate data communications. In some embodiments, the COM ports 250 may be an interface with the network 150 and/or one or more components in the security screening system 100. In some embodiments, the COM ports 250 may be any type of wired or wireless network interface. Merely by way of example, the COM ports 250 may include a cable network interface, a wireline network interface, an optical fiber network interface, a telecommunications network interface, an intranet interface, an internet interface, a local area network (LAN) interface, a wide area network (WAN) interface, a wireless local area network (WLAN) interface, a metropolitan area network (MAN) interface, a wide area network (WAN) interface, a public telephone switched network (PSTN) interface, a Bluetooth network interface, a ZigBee network interface, a near field communication (NFC) network interface, or the like, or any combination thereof. In some embodiments, the COM ports 250 may be implemented according to programming and/or computer language(s). The COM ports 250 may include circuitry for coupling the computing device 200 to one or more networks, and is constructed for use with one or more communication protocols and technologies including, global system for mobile communications (GSM), code-division multiple access (CDMA), time-division multiple access (TDMA), general packet radio service (CPRS), enhanced data rate for GSM evolution (EDGE), wideband code division multiple access (WCDMA), high speed downlink packet access (HSDPA), long term evolution (LTE), user datagram protocol (UDP), transmission control protocol/Internet protocol (TCP/IP), short message service (SMS), wireless application protocol (WAP), ultra wide band (UWB), IEEE 802.16 worldwide interoperability for microwave access (WiMax), session initiated protocol/real-time transport protocol (SIP/RTP), or any of a variety of other wireless communication protocols.

The internal communication bus 210 may transfer information and/or data between one or more components of the computing device 200. For example, the internal communication bus 210 may connect the processor 220 with a storage (e.g., the RAM 240, the ROM 230, etc.) for exchanging information and/or data. In some embodiments, the internal communication bus 210 may include a hardware component and/or a software implementation. For example, the internal communication bus 210 may include a wire, an optical fiber, a cable, a communication protocol, or the like, or any combination thereof.

Figure 3:
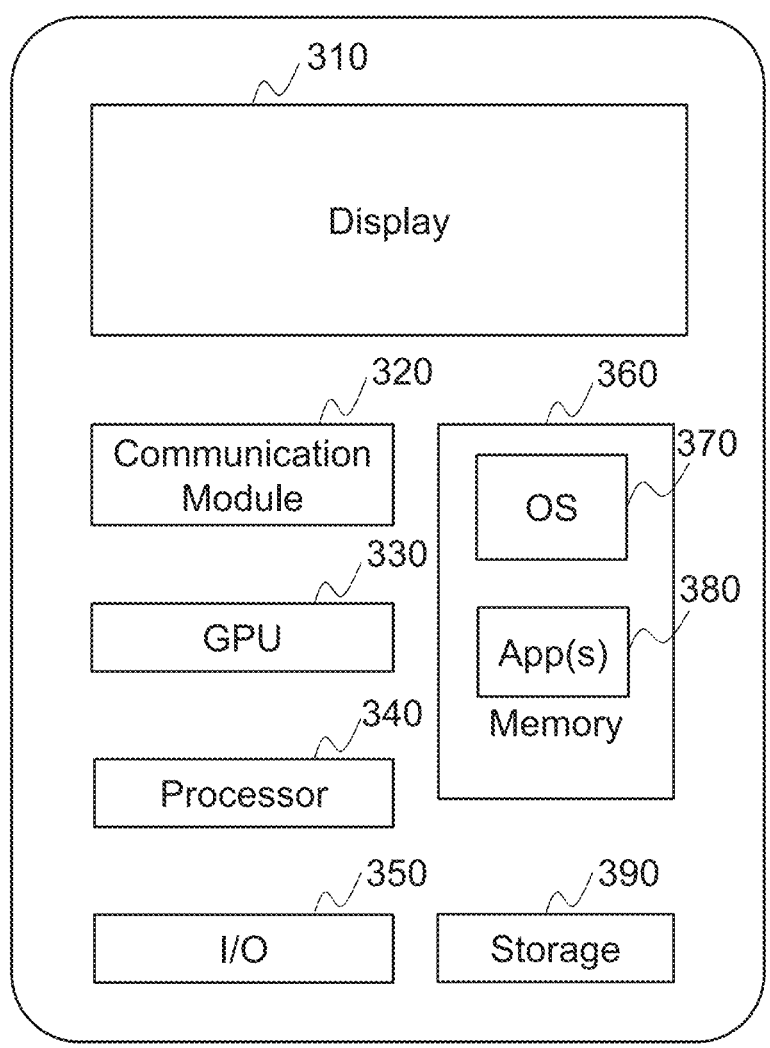
FIG. 3 is a schematic diagram illustrating exemplary components of an exemplary user device according to some embodiments of the present disclosure.

FIG. 3 is a schematic diagram illustrating exemplary components of an exemplary user device according to some embodiments of the present disclosure. As illustrated in FIG. 3, the user device 300 may include a communication module 320, a display 310, a graphic processing unit (GPU) 330, a central processing unit (CPU) 340, an I/O port 350, a memory 360, and a storage 390. In some embodiments, any other suitable component, including but not limited to a system bus or a controller (not shown), may also be included in the user device 300. In some embodiments, a mobile operating system 370 (e.g., iOS™, Android™, Windows Phone™) and one or more applications 380 may be loaded into the memory 360 from the storage 390 in order to be executed by the processor 340. The user device 300 may be an embodiment of the terminal 130. The applications 380 may include an image player for receiving and displaying an image provided by the security screening equipment 110 and/or the image processing device 120 through the network 150.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
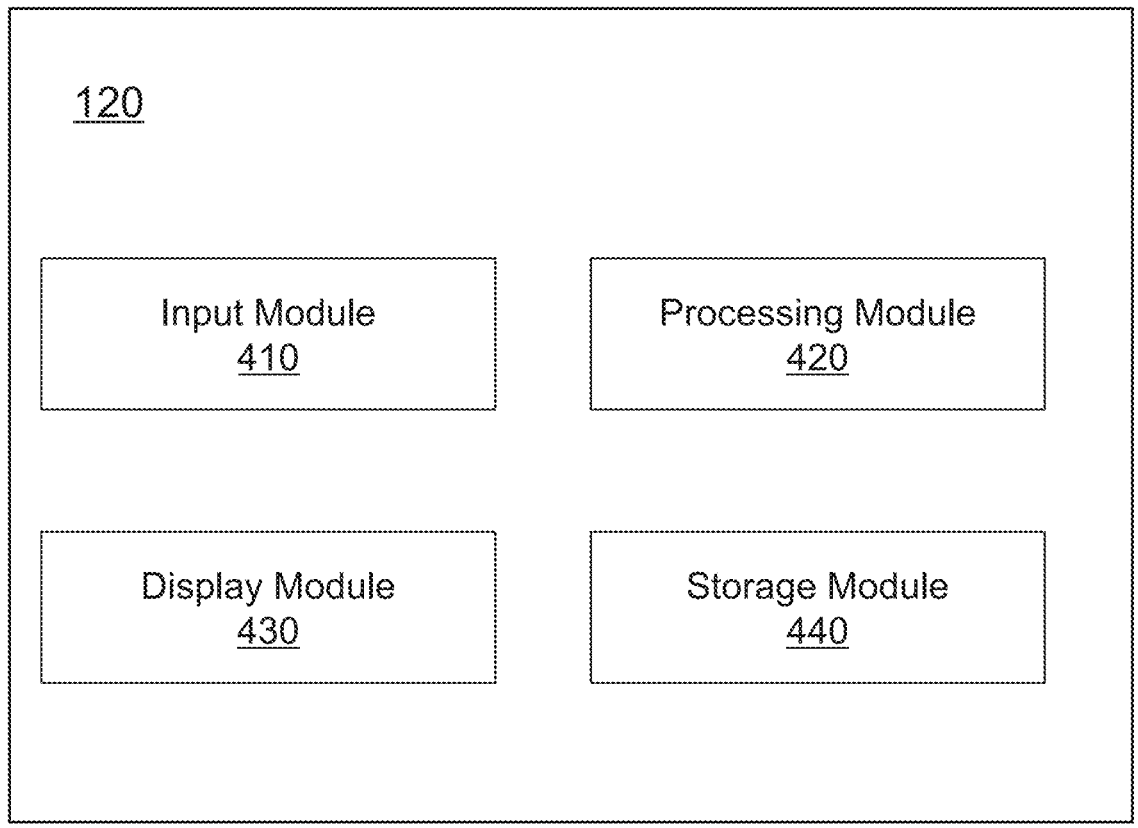
FIG. 4 is a block diagram of an exemplary image processing device according to some embodiments of the present disclosure.

FIG. 4 is a block diagram of an exemplary image processing device 120 according to some embodiments of the present disclosure. The image processing device 120 may include an input module 410, a processing module 420, a display module 430, and a storage module 440.

The input module 410 may be configured to receive information input by a user. In some embodiments, the information received by the input module 410 may be stored in the storage module 440, and/or be transmitted to the processing module 420 for further processing. In some embodiments, the information received by the input module 410 may include controlling instructions, and may be transmitted to the security screening equipment 110 to control the operation of the image capture device and the movement of the conveyor belt 113. For example, the information received by the input module 410 may include the imaging range of the image capture device of the security screening equipment 110, the size of the X-ray detector panel, the size of the image captured by the security screening equipment 110, etc. For another example, the input module 410 may be configured to receive parameters to set the speed of the conveyor belt 113, pause the movement of the conveyor belt 113, set a first frame rate of the image captured by the security screening equipment 110, and set a second frame rate of the image processed by the image processing device 120. As used herein, the first frame rate of the image captured by the security screening equipment 110 may represent an image capturing frequency. For example, the first frame rate of the image captured by the security screening equipment 110 may be set to 60 frames per second (fps), which represents that the security screening equipment 110 captures 60 images per second, i.e., the security screening equipment 110 captures or generates one image every 16.67 ms in a temporal sequence. The second frame rate of the image processed by the image processing device 120 may represent an image processing frequency. For example, the second frame rate of the image processed by the image processing device 120 may be set to 15 fps, which represents that the image processing device 120 acquires and processes 15 images per second. In some embodiments, the operator may set the first frame rate to 60 fps, which represents that the security screening equipment 110 captures an image every 16.67 ms, and set the second frame rate to 15 fps, which represents that the image processing device 120 processes an image every 66.67 ms, thus the image processing device 120 may acquire one image for every four images to process. For example, the security screening equipment 110 may capture a plurality of images in a temporal sequence every 16.67 ms, and the image processing device 120 may acquire the first generated image, the fifth generated image, the ninth generated image, . . . of the plurality images in the temporal sequence for further processing.

The processing module 420 may be configured to process image. In some embodiments, the processing module 420 may obtain an image from the security screening equipment 110, the terminal 130, the storage device 140, or the storage module 440. In some embodiments, the processing module 420 may identify an object in the image by perform smart algorithm analysis on the image and determine a coordinate of the object in the image. In some embodiments, the processing module 420 may determine a pixel distance between the object in two adjacent images of the plurality of images. Additionally, the processing module 420 may render an object box surrounding the identified object in the image. Details of the processing module 420 may be described in the present disclosure. See, e.g., FIG. 5 and the descriptions thereof.

The display module 430 may be configured to display information. The information may include data before and/or after image processing, a request for input or parameter relating to image capturing and/or processing. In some embodiments, the information may also include instructions using to prompt user to perform an input or other control operations. The display module 430 may be configured to display an image captured by the security screening equipment 110 and an object box rendered by the processing module 420 simultaneously. Exemplary display module 430 may include a liquid crystal display (LCD), a light emitting diode (LED)-based display, a flat panel display or curved screen (or television), a cathode ray tube (CRT), or the like, or a combination thereof.

The storage module 440 may be configured to store information and/or data received from the input module 410, image data generated by the security screening equipment 110, processed data by the processing module 420, or the like, or any combination thereof. In some embodiments, the storage module 440 may include a mass storage, removable storage, a volatile read-and-write memory, a read-only memory (ROM), or the like, or any combination thereof. The mass storage may include a magnetic disk, an optical disk, a solid-state drive, etc. The removable storage may include a flash drive, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage module 440 may store one or more programs and/or instructions that may be executed by the processor 220 of the image processing device 120 (e.g., the processing module 420) to perform exemplary methods and/or processes described in the disclosure. For example, the storage module 440 may store programs and/or instructions executed by the processor 220 of the image processing device 120 to obtain image data, determine a plurality of images in a temporal sequence, determine a processed image by performing smart algorithm analysis, rendering an object box in each of the plurality of images.

Modules of the image processing device 120 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the input module 410 and the display module 430 may be combined into a single module (e.g., a touch screen) that may be configured to receive information and/or data input by a user, and display the image and the object box.

Figure 5:
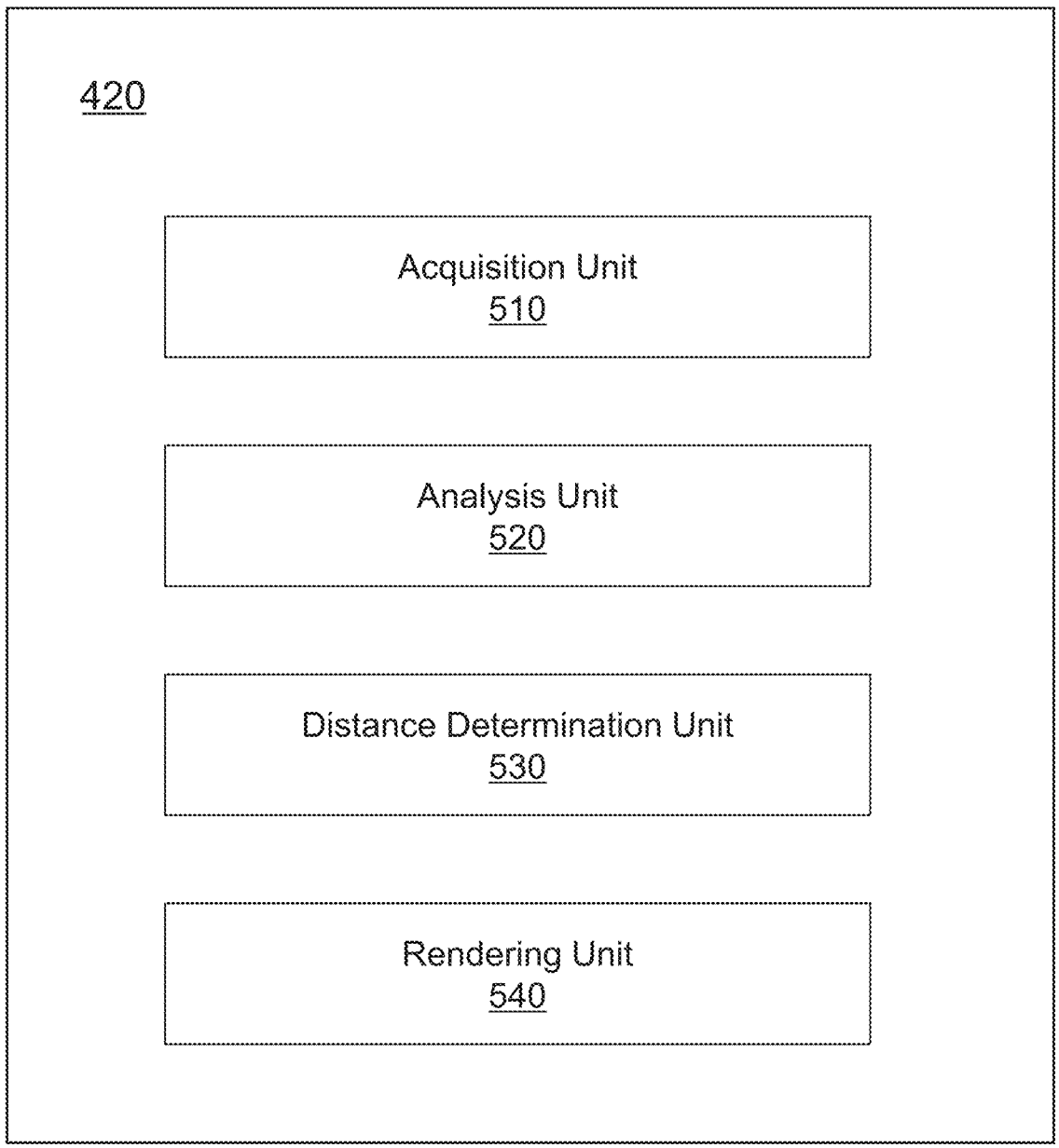
FIG. 5 is a block diagram of an exemplary processing module according to some embodiments of the present disclosure.

FIG. 5 is a block diagram illustrating an exemplary processing module according to some embodiments of the present disclosure. As illustrated in FIG. 5, the processing module 420 may include an acquisition unit 510, an analysis unit 520, a distance determination unit 530, and a rendering unit 540.

The acquisition unit 510 may obtain one or more images from other components of the security screening system 100. In some embodiments, the acquisition unit 510 may obtain a plurality of images from the security screening equipment 110, the storage device 140, the terminal 130, or the storage module 440. The plurality of images may be captured by the security screening equipment 110 in a temporal sequence according to a first frame rate. The first frame rate may be set by a user. For example, the first frame rate of the image captured by the security screening equipment 110 may be set to 60 fps, which represents that the security screening equipment 110 captures 60 images per second, i.e., the security screening equipment 110 captures an image every 16.67 ms in a temporal sequence. The acquisition unit 510 may further acquire part of the plurality of images according to a second frame rate. The second frame rate may also be set by a user. For example, the second frame rate may be set to 15 fps, which represents that acquisition unit 510 acquires 15 images per second for further processing. In some embodiments, the user may set the first frame rate to 60 fps and set the second frame rate to 15 fps, which represents that the security screening equipment 110 captures an image every 16.67 ms, and the acquisition unit 510 acquires one image for every four images for further processing. For example, the security screening equipment 110 may capture a plurality of images in a temporal sequence every 16.67 ms, and the acquisition unit 510 may acquire the first generated image, the fifth generated image, the ninth generated image, . . . of the plurality images in the temporal sequence for further processing.

Figure 11A:
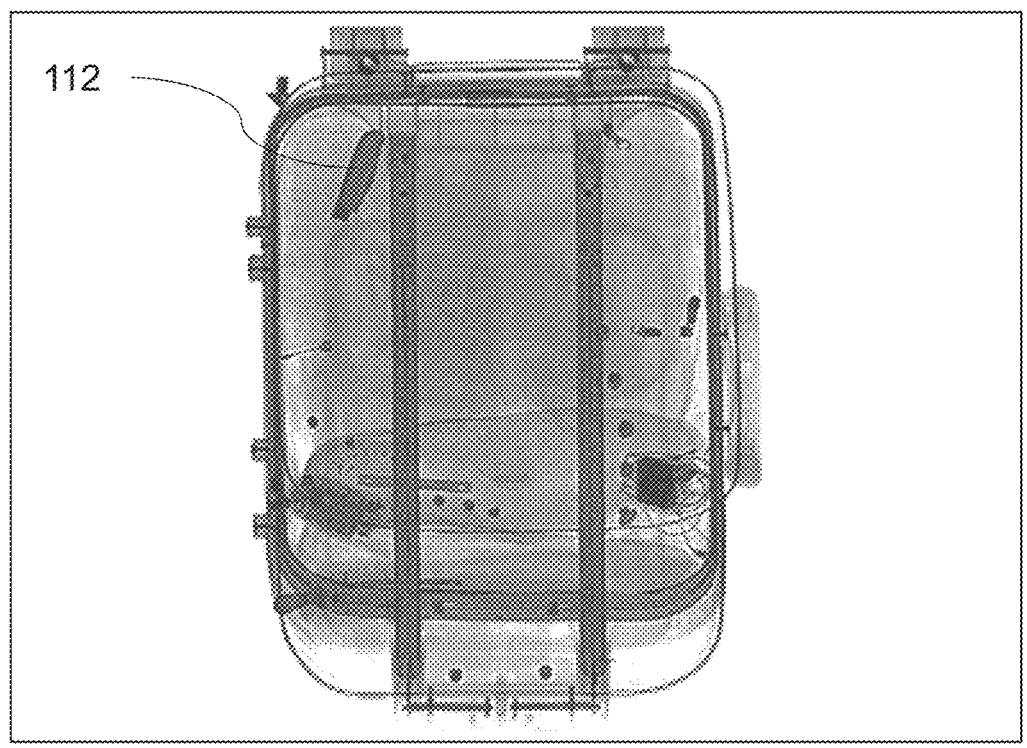
FIG. 11A illustrates a schematic image captured by the security screening system according to some embodiments of the present disclosure.
Figure 11B:
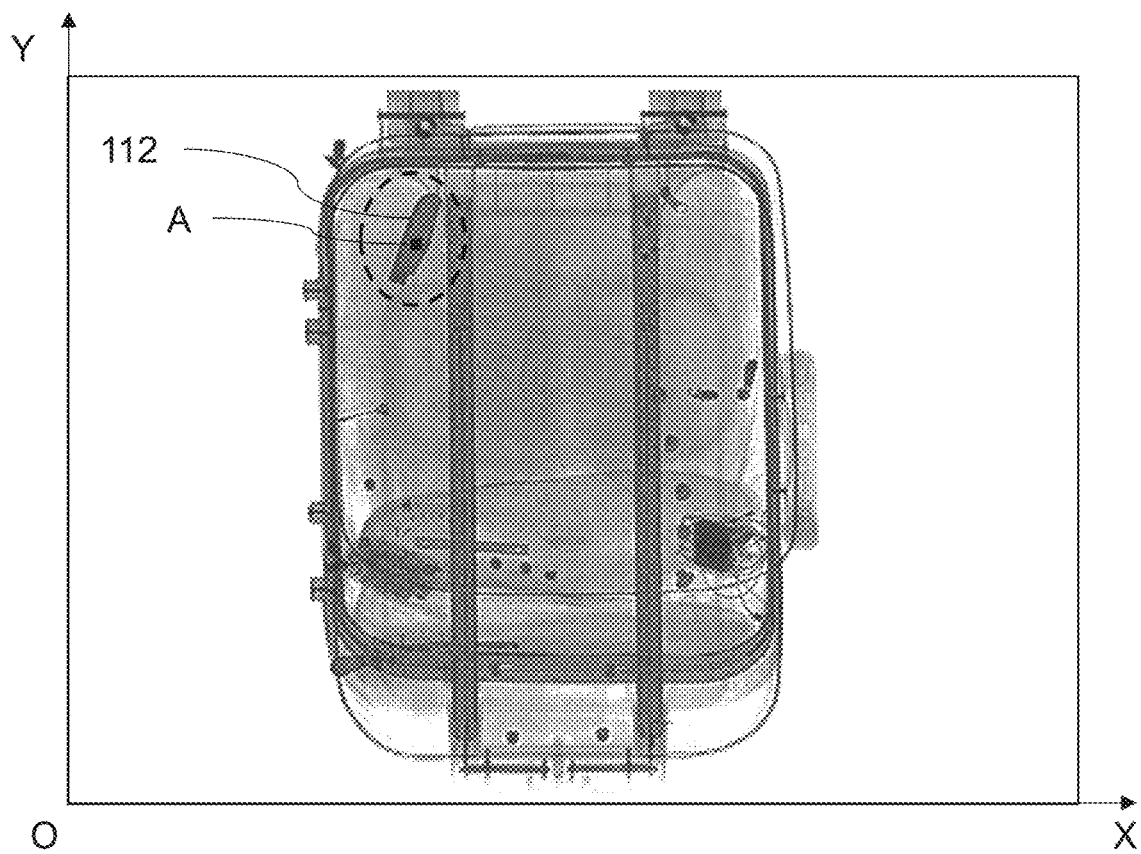
FIG. 11B illustrates a schematic processed image determined by the security screening system based on the image shown in FIG. 11A according to some embodiments of the present disclosure.

The analysis unit 520 may be configured to process an image to determine a processed image. The image may be acquired by the acquisition unit 510 according to the second frame rate. The processing of the image may include identifying an object in the image by performing smart algorithm analysis on the image and determining a coordinate of the object in the image. In some embodiments, the processing of the image may further include determining that a contour of the identified object is incomplete and completing the contour of the identified object. For example, there may be two objects partially overlapping in a luggage, and a contour of a target object may be incomplete in the image due to the coverage of the other object. The analysis unit 520 may also identify the target object by analyzing the image using, for example, an intelligent algorithm. The smart algorithm analysis may be used to identify an object in the image. The smart algorithm analysis may include image identification algorithm such as a convolutional neutral network (CNN), Region-based Convolutional Network (R-CNN), Spatial Pyramid Pooling Network (SPP-Net), Fast Region-based Convolutional Network (Fast R-CNN), Faster Region-based Convolutional Network (Faster R-CNN), or the like, or any combination thereof. The processed image may include data of the corresponding image and information relating to the object. The information relating to the object may include one or more pixels of the object and the coordinate of the object in the image. For example, the image acquired by the acquisition unit 510 from the security screening equipment 110 may be as shown in FIG. 11A. The analysis unit 520 may perform the smart algorithm analysis on the image to identify an object 112 (e.g., a knife) in the image. The analysis unit 520 may further determine a coordinate of the object 112 in the image. Thus, the analysis unit 520 may determine the processed image including the corresponding image and the information relating to the object, as shown in FIG. 11B. As used herein, the coordinate of the object 112 may include a coordinate of a pixel of the object 112 in the image, or a coordinate of a range including the one or more pixels of the object 112 in the image.

For example, the image may include pixel array consisting of a plurality of pixels, such as 1920*1080 (pixel array including pixels of 1920 columns and 1080 rows). The analysis unit 520 may identify the object 112 by performing the smart algorithm analysis on the image. The analysis unit 520 may determine the one or more pixels of the object 112 in the image. The analysis unit 520 may then determine a coordinate system in the image in order to determine the coordinate of the object 112. The analysis unit 520 may determine a pixel of the image as the origin of the coordinate system, e.g., pixel O of the first column and the last row of the image, as shown in FIG. 11B. The last row of the image may be the X-axis and the first column of the image may be the Y-axis. Therefore the analysis unit 520 may determine a coordinate of any pixel in the image using a column number count and a row number count. In some embodiments, the analysis unit 520 may determine a center pixel of the image as the origin of the coordinate system. Furthermore, the image processing device 120 may determine any pixel as the origin of the coordinate system.

In some embodiments, the coordinate of the object 112 may include a coordinate of a pixel of the object 112 in the image. The pixel may include a center pixel A of the object, a vertex pixel of the object 112, or any pixel of the object 112. The analysis unit 520 may determine the coordinate of pixel A ($X_A$, $Y_A$) as the coordinate of the object 112, wherein $X_A$ represents the column number count of the pixel A in the pixel array, and $Y_A$ represents the row number count of the pixel A in the pixel array.

In some embodiments, the coordinate of the object 112 may be a coordinate of a range including the one or more pixels of the object 112 in the image. The range may include a rectangle region, a square region, a circle region, an oval region, a triangle region, an irregular region, or the like, or any combination thereof. In some embodiments, the range may be a rectangle region. The analysis unit 520 may identify the object including the one or more pixels in the image, and determine a coordinate for each of the plurality of pixels. The analysis unit 520 may determine, among the coordinates of the one or more pixels, a maximum X-axis value $X_{max}$, a maximum Y-axis value $Y_{max}$, a minimum X-axis value $X_{min}$, and a minimum Y-axis value $Y_{min}$. The analysis unit 520 may determine a rectangle region defined by ($X_{min}$, $X_{max}$, $Y_{min}$, $Y_{max}$) as the coordinate of the object 112. The rectangle region defined by ($X_{min}$, $X_{max}$, $Y_{min}$, $Y_{max}$) may be surrounded by a left column of $X_{min}$, a right column of $X_{max}$, a top row of $Y_{max}$, and a bottom row of $Y_{min}$. In some embodiments, the range may be a circle region. The analysis unit 520 may determine the coordinate of pixel A ($X_A$, $Y_A$) as the center of the circle region, and determine a maximum distance $D_{max}$ among distances between the pixel A and any other pixels of the one or more pixels of the object as the radius of the circle region. Accordingly, the analysis unit 520 may determine the circle region defined by center point ($X_A$, $Y_A$) and the radius r=$D_{max}$ as the coordinate of the object 112. In some embodiments, the range may be a square region. The analysis unit 520 may determine the square region defined by the center point ($X_A$, $Y_A$) and side-length L=2*$D_{max}$ as the coordinate of the object 112.

In some embodiments, the image captured by the security screening equipment 110 may be a 3D image including a plurality of voxels. The analysis unit 520 may determine a coordinate system in the 3D image and determine a coordinate (X, Y, Z) of each voxel, similarly to the 2D image. The coordinate of the object 112 in the 3D image may include a coordinate of a voxel of the object in the image, or a coordinate of a range including one or more voxels of the object in the image. The range may include a cuboid region, a cube region, a sphere region, an ellipsoid region, a pyramid region, an irregular region, or the like, or any combination thereof. Similar to 2D images, the coordinate of the object 112 may also be determined by the analysis unit 520 using values of X-axis, Y-axis, and Z-axis of the coordinate system.

The distance determination unit 530 may be configured to determine a pixel distance between the object in two adjacent images. As used herein, the two adjacent images may be two images captured by the security screening equipment 110 at two adjacent time points, and the pixel distance between the object in the two adjacent images may be a distance between a first coordinate of the object in a first image of the two adjacent images and a second coordinate of the object in a second image of the two adjacent images. In some embodiments, the pixel distance may be a number count of pixels of the image along one or more directions. The one or more directions may include a first direction parallel to the X-axis of the coordinate system or a second direction parallel to the Y-axis. In some embodiments, the first direction parallel to the X-axis may be the moving direction of the conveyor belt 113. For example, if the first coordinate of the object in the first image of the two adjacent images is (100, 100), and the second coordinate of the object in the second image of the two adjacent images is (80, 100), the distance determination unit 530 may determine that the pixel distance between the object in the two adjacent images is 20 along the first direction parallel to the X-axis. Details of the determination of the pixel distance between the object in two adjacent images of the plurality of images may be described in the present disclosure.

The rendering unit 540 may be configured to render an object box in the image. The object box may surround the object identified by the analysis unit 520. The object box may be displayed on a screen in accordance with the image in order to draw attention of a security staff. The object may be a knife, a gun, a cigarette lighter, or the like, and may have various shapes. In some embodiments, the object box may have an irregular shape, for example, a shape of a contour of the identified object. In some embodiments, the object box may have a shape of rectangle, square, triangle, circle, oval, or the like, or any combination thereof. The rendering unit 540 may render the object box using a color different from the image for alert, e.g., red, green, yellow, etc. The rendering unit 540 may further render the object box in a twinkling manner. Details of the rendering may be described in the present disclosure.

Figure 12:
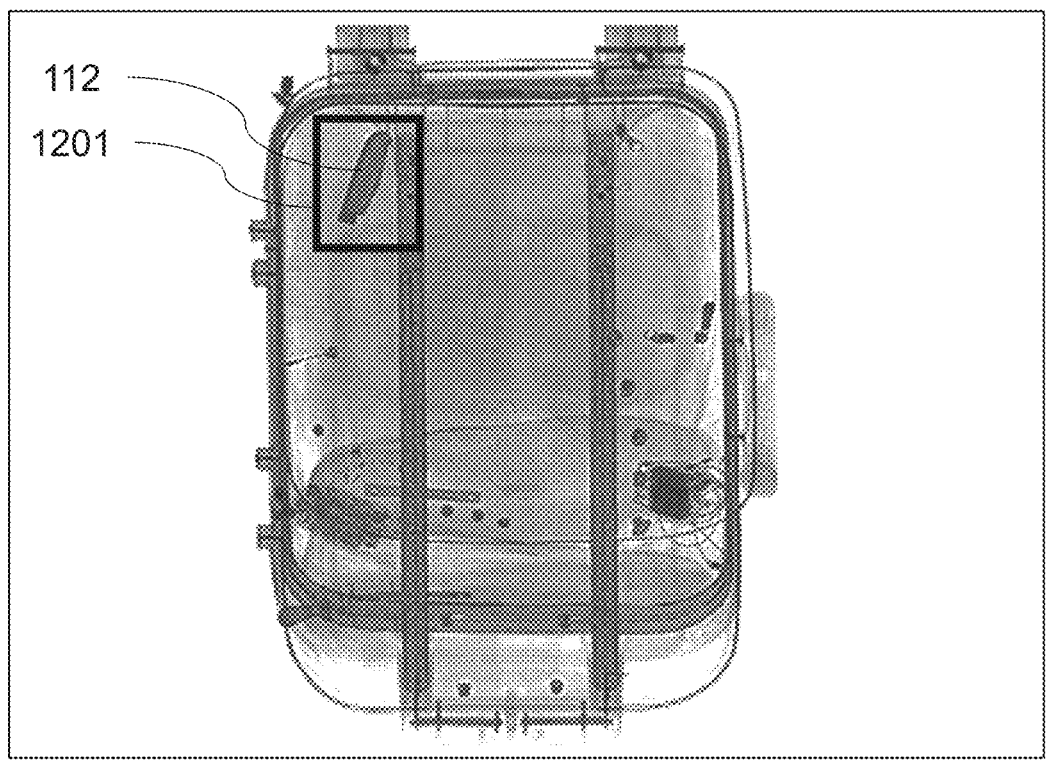
FIG. 12 illustrates a schematic image shown in FIG. 11A and the object box displayed on a screen according to some embodiments of the present disclosure.

In some embodiments, the rendering unit 540 renders the object box based on the coordinate of the object 112 in the image. The object box 1201 may surround the object 112, as shown in FIG. 12. In some embodiments, the object box 1201 may include sides of the range representing the coordinate of the object 112. In some embodiments, the object box 1201 may surround a region larger than the range representing the coordinate of the object 112. For example, the range representing the coordinate of the object 112 may be a rectangle region defined by ($X_{min}$, $X_{max}$, $Y_{min}$, $Y_{max}$), and the object box 1201 may be a rectangle defined by ($X_{min}-N_{x1}$, $X_{max}+N_{x2}$, $Y_{min}-N_{Y1}$, $Y_{max}+N_{Y2}$), wherein $N_{x1}$, $N_{x2}$, $N_{Y1}$, $N_{Y2}$ may be any integer respectively. For example, the range representing the coordinate of the object 112 may be a square region defined by center point ($X_A$, $Y_A$) and side-length L=2*$D_{max}$, or a circle region defined by center point ($X_A$, $Y_A$) and the radius $D_{max}$, and the object box 1201 may be a circle defined by the center point ($X_A$, $Y_A$) and a radius $D_{max}$+D, wherein D may be any integer.

Units of the processing module 420 may be connected to or communicate with each other via a wired connection or a wireless connection. The wired connection may include a metal cable, an optical cable, a hybrid cable, or the like, or any combination thereof, Two or more of the units may be combined into a single unit, and any one of the units may be divided into two or more sub-units. For example, the acquisition unit 510 and the analysis unit 520 may be combined into a single unit that may be configured to acquire images and process the acquired images. For another example, the analysis unit 520 may be divided into two sub-units, one of the sub-unit may be configured to identify the object in the image and the other sub-unit may be configured to determine a coordinate of the object.

Figure 6:
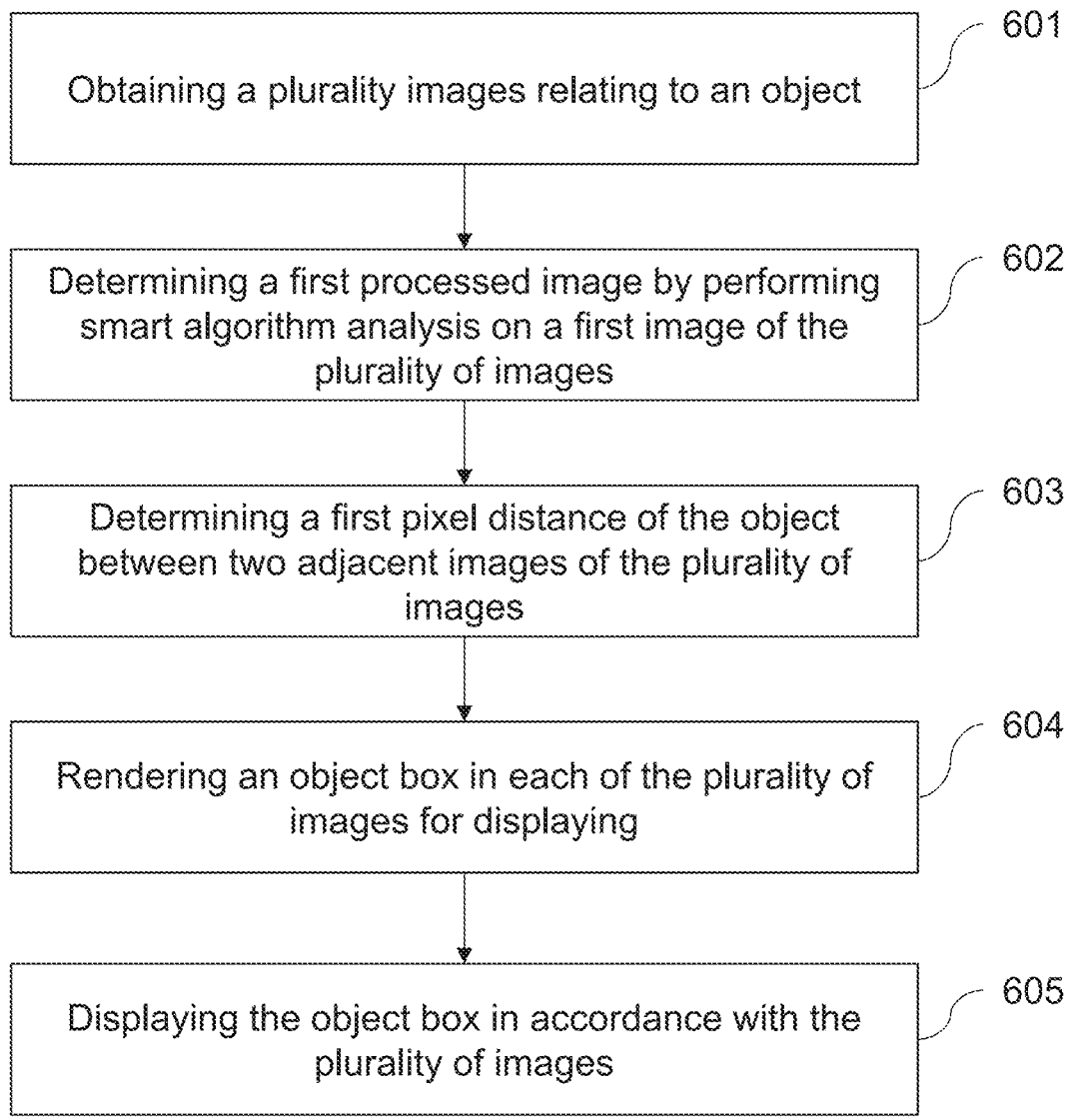
FIG. 6 is a flow chart illustrating an exemplary process for rendering object boxes according to some embodiments of the present disclosure.

FIG. 6 is a flow chart illustrating an exemplary process for rendering object boxes according to some embodiments of the present disclosure. The process 600 may be executed by the security screening system 100. For example, the process 600 may be implemented as a set of instructions stored in the storage ROM 230 or RAM 240. The processor 220 and/or the modules/units in FIGS. 4 and 5 may execute the set of instructions, and when executing the instructions, the processor 220 and/or the modules/units may be configured to perform the process 600. The operations of the illustrated process presented below are intended to be illustrative. In some embodiments, the process 600 may be accomplished with one or more additional operations not described and/or without one or more of the operations discussed. Additionally, the order in which the operations of the process 600 as illustrated in FIG. 6 and described below is not intended to be limiting.

In 601, the acquisition unit 510 may obtain a first plurality of images. In some embodiments, the first plurality of images may be captured by the security screening equipment 110 in a temporal sequence. For example, when a luggage is located on the conveyor belt 113, the luggage may be transmitted to an internal cavity of the security screening equipment 110. When the luggage is moving on the conveyor belt 113, the security screening equipment 110 may capture a video including the first plurality of images according to a first frame rate set by a user. In some embodiments, each of the first plurality of images may relate to an object. For example, each of the first plurality of images may include at least part of the object. In some embodiments, some, but not all, of the first plurality of images may relate to the object. In some embodiments, the phrase "the first plurality of images" refers to the images that may relate to the object.

In some embodiments, the acquisition unit 510 may obtain the first plurality of images from the security screening equipment 110 and transmit the first plurality of images to a storage (e.g., the storage device 140, the terminal 130, or the storage module 440). In some embodiments, the acquisition unit 510 may obtain the first plurality of images from the storage (e.g., the storage device 140, the terminal 130, or the storage module 440).

In 602, the analysis unit 520 may determine a first processed image by performing a smart algorithm analysis on a first image of the first plurality of images. In some embodiments, the first plurality of images may be captured in a temporal sequence. The first image of the first plurality of images may be the first generated image, in a temporal sense, in the first plurality of images. In some embodiments, the analysis unit 520 may perform smart algorithm analysis on the first image to identify the object in the first image. The object may include a knife, a gun, a cigarette lighter, or the like. In some embodiments, the smart algorithm analysis may include image identification algorithm such as a convolutional neutral network (CNN), Region-based Convolutional Network (R-CNN), Spatial Pyramid Pooling Network (SPP-Net), Fast Region-based Convolutional Network (Fast R-CNN), Faster Region-based Convolutional Network (Faster R-CNN). For example, the analysis unit 520 may process the first image using a CNN model to identify the object. The CNN model may be trained in advance. The analysis unit 520 may determine one or more pixels of the object in the first image, and determine a first coordinate of the object in the first image. The first processed image may include the first image and information relating to the object in the first image. The information relating to the object may include the one or more pixels of the object and the first coordinate of the object in the first image.

For example, the first image can be FIG. 11A, which may include the object 112, e.g., a knife. The analysis unit 520 may perform the smart algorithm analysis on the first image to identify the object 112 in the first image and determine the one or more pixels of the object 112. The analysis unit 520 may further determine the first coordinate of the object 112 in the first image. The analysis unit 520 may determine the first processed image including data of the first image, the object 112 identified and the first coordinate of the object 112, as shown in FIG. 11B.

In 603, the distance determination unit 530 may determine a first pixel distance between the object in two adjacent images of the first plurality of images. In some embodiments, the two adjacent images may be two images captured by the security screening equipment 110 at two adjacent time points. For example, the two adjacent images may include the first image and the second image captured by the security screening equipment 110 later than and next to the first image. The first pixel distance between the object in the two adjacent images may be a distance between the first coordinate of the object in the first image and a second coordinate of the object in the second image of the two adjacent images. The first pixel distance may be a number count of pixels along the X-axis direction and/or along the Y-axis direction. In some embodiments, the X-axis direction may be parallel to the moving direction of the object or the conveyor belt 113. In some embodiments, the first pixel distance between the object in any two adjacent images of the first plurality of images may be the same. In some embodiments, the first pixel distance between the object in two adjacent images of the first plurality of images may be different. Details of the determination of the first pixel distance between the object in two adjacent images of the first plurality of images may be described in the present disclosure. See, e.g., FIG. 7 or FIG. 8 and the descriptions thereof.

In 604, the rendering unit 540 may render an object box in the first image. The object box may surround the object identified by the analysis unit 520. In some embodiments, the rendering unit 540 may render the object box in each of the first plurality of images. The object box may be displayed in accordance with each of the first plurality of images. In some embodiments, the object box may be configured to remind a user (e.g., security staff) that there is a dangerous thing (the object) in a luggage.

In some embodiments, the rendering unit 540 may render the object box in the first image based on the first coordinate of the object in the first image In some embodiments, the rendering unit 540 may render the object box in each of the first plurality of images based on the first coordinate of the object in the first image, the first pixel distance, and a number count of images between the image and the first image. Details of the rendering the object box in each of the first plurality of images based on the first coordinate of the object in the first image and the first pixel distance may be described in the present disclosure. See, e.g., FIG. 10 and the descriptions thereof.

In 605, the display module 430 may display object boxes in accordance with the first plurality of images. In some embodiments, the display module 430 may display each image of the first plurality of images and the corresponding object box simultaneously. In some embodiments, the display module 430 may display the first plurality of images and the object box in each of the first plurality of images according to the first frame rate. For example, the display module 430 may display an image once a time and display 60 images per second.

In some embodiments, the security screening equipment 110 may be configured to capture a video including the first plurality of images according to the first frame rate, and the display module 430 configured to display the video including the first plurality of images and the corresponding object box in each of the first plurality of images according to the first frame rate. In some embodiments, the display module 430 may display the first plurality of images and the object box in each of the first plurality of images according to a third frame rate. The third frame rate may be different with the first frame rate. For example, the third frame rate may larger than the first frame rate or less than the first frame rate.

It should be noted that the above description of process 600 is merely provided for the purposes of illustration, and not intended to be understood as the only embodiment. For persons having ordinary skills in the art, various variations and modifications may be conduct under the teaching of some embodiments of the present disclosure. In some embodiments, some operations may be reduced or added. However, those variations and modifications may not depart from the protecting of some embodiments of the present disclosure. For example, one or more other optional operations (e.g., a storing operation) may be added in the process

600. In the storing operation, the image processing device 120 may store information and/or data associated with the plurality of images, the processed image in a storage device (e.g., the storage device 140, the storage module 440, the storage 390) as described elsewhere in the present disclosure.

Figure 7:
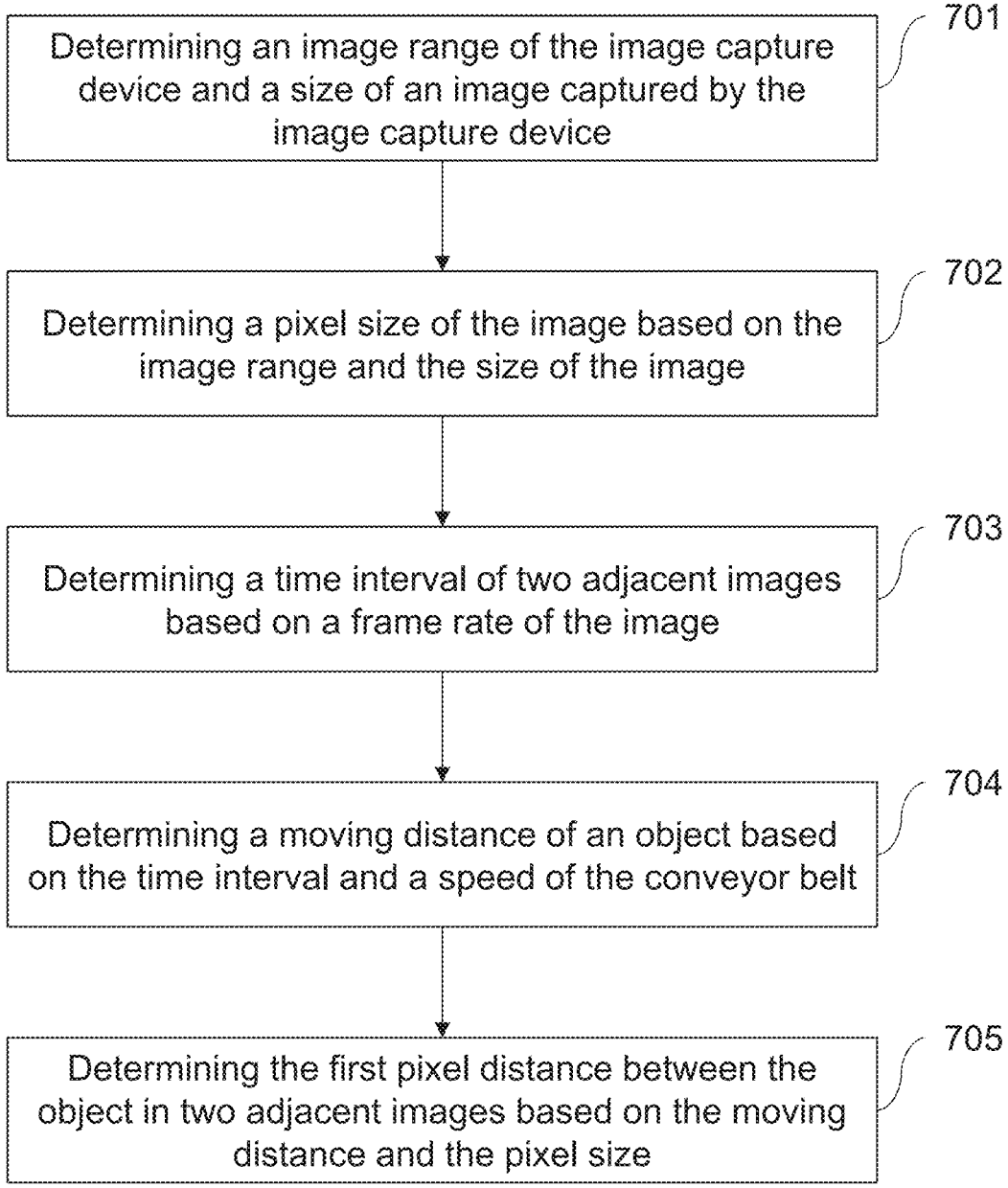
FIG. 7 is a flow chart illustrating an exemplary process for determining a first pixel distance between an object in two adjacent images according to some embodiments of the present disclosure.

FIG. 7 is a flow chart illustrating an exemplary process for determining a first pixel distance between an object in two adjacent images according to some embodiments of the present disclosure. The process 700 may be executed by the security screening system 100. For example, the process 700 may be implemented as a set of instructions stored in the storage ROM 230 or RAM 240. The processor 220 and/or the modules/units in FIGS. 4 and 5 may execute the set of instructions, and when executing the instructions, the processor 220 and/or the modules/units may be configured to perform the process 700. The operations of the illustrated process presented below are intended to be illustrative. In some embodiments, the process 700 may be accomplished with one or more additional operations not described and/or without one or more of the operations discussed. Additionally, the order in which the operations of the process 700 as illustrated in FIG. 7 and described below is not intended to be limiting.

In 701, the distance determination unit 530 may determine an imaging range of the image capture device of the security screening equipment 110 and a size of an image captured by the image capture device. The imaging range of the image capture device may be a range that the image capture device can.

In some embodiments, the size of the image may be set by a user via the image processing device 120 or the terminal 130. In some embodiments, the size of the image may be set by the security screening system 100 automatically. The size of the image may include the number of pixels, which may indicate the resolution of the image. For example, the size of the image may be 640*480, 800*600, 1024*768, 1280*800, 960*540, 1280*720, 1366*768, 1980*1080, etc.

In some embodiments, the imaging range of the image capture device may be set by a user via the image processing device 120 or the terminal 130. In some embodiments, the imaging range of the image capture device may be determined by the security screening system 100 automatically. In some embodiments, the image capture device may be an optical camera or an infrared camera, and the imaging range may be determined based at least on a focal length of lens and distance between the lens and the conveyor belt 113.

In some embodiments, the image capture device may be an X-ray imaging device including an X-ray generator 111 and an X-ray detector panel. The imaging range of the image capture device may be the size of the X-ray detector panel. For example, the X-ray detector panel may be a rectangle having a length of long side of 1 m and a length of short side of 0.8 m, and the imaging range of the image capture device may be 1 m*0.8 m. In some embodiments, the imaging range of the image capture device may be the size of a region including X-ray detectors in the X-ray detector panel. For example, the X-ray detector panel may be a rectangle having a length of long side of 1 m and a length of short side of 0.8 m, and the region including X-ray detectors in the X-ray detector panel may be a rectangle having a length of long side of 0.9 m and a length of short side of 0.7 m, and the imaging range of the image capture device may be 0.9 m*0.7 m.

In some embodiments, the imaging range may be a rectangle, and the long side of the rectangle may along a moving direction of the object. The row of the pixel array of the image, e.g., the X-axis direction, may be parallel to the moving direction of the object.

In 702, the distance determination unit 530 may determine a pixel size of the image based on the imaging range of the image capture device and the size of the image. The pixel size may be an actual size represented by a pixel of the image. For example, the imaging range of the image capture device may be 1 m*0.8 m, and the size of image may be 800*1000, which means that the image consists of pixels of 800 rows and 1000 columns. The distance determination unit 530 may determine the pixel size as 1 mm*1 mm.

In 703, the distance determination unit 530 may determine a time interval between two adjacent images of a first plurality of images based on a first frame rate set by a user. The first plurality of images may be captured by the security screening equipment 110 in a temporal sequence. In some embodiments, the first frame rate may be 60 fps, which means that the security screening equipment 110 may capture 60 images per second. The distance determination unit 530 may determine that the time interval between the two adjacent images is 16.67 ms.

In 704, the distance determination unit 530 may determine a moving distance of an object based on the time interval and a speed of the conveyor belt 113. In some embodiments, the object may be located on the conveyor belt 113 of the security screening equipment 110, and move in accordance with the conveyor belt 113. The speed of the conveyor belt 113 may be set by a user via the image processing device 120 or the terminal 130. For example, the speed of the conveyor belt 113 may be set to 1 m/s, and the distance determination unit 530 may determine the moving distance is 16.67 mm along the moving direction.

In 705, the distance determination unit 530 may determine the first pixel distance between the object in two adjacent images of the first plurality of images based on the moving distance and the pixel size. For example, the moving distance may be 16.67 mm and the pixel size may be 1 mm*1 mm, then the distance determination unit 530 may determine the first pixel distance as 16.67 along the moving direction, e.g., the X-axis direction. The pixel distance between the object in two adjacent images may indicate a pixel number count between the object in the two adjacent images along the moving direction of the object, i.e., the X-axis direction.

It should be noted that the above description of process 700 is merely provided for the purposes of illustration, and not intended to be understood as the only embodiment. For persons having ordinary skills in the art, various variations and modifications may be conduct under the teaching of some embodiments of the present disclosure. In some embodiments, some operations may be reduced or added. However, those variations and modifications may not depart from the protecting of some embodiments of the present disclosure. For example, one or more other optional operations (e.g., a storing operation) may be added in the process 700. In the storing operation, the image processing device 120 may store information and/or data associated with the imaging range of the image capture device, the size of the image, the pixel size, the moving distance, the first pixel distance in a storage device (e.g., the storage device 140, the storage module 440, the storage 390) as described elsewhere in the present disclosure.

Figure 8:
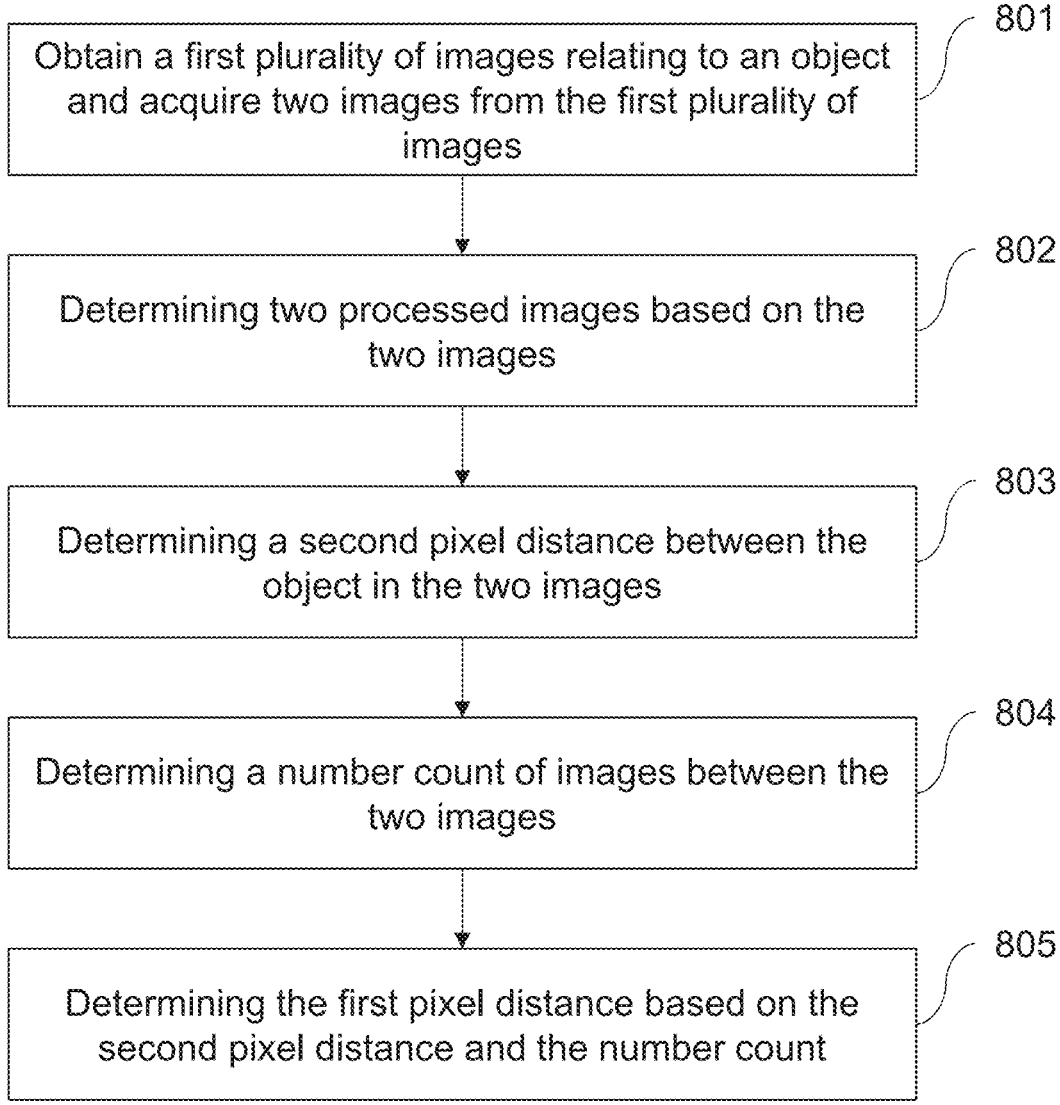
FIG. 8 is a flow chart illustrating another exemplary process for determining a first pixel distance between an object in two adjacent images according to some embodiments of the present disclosure.

FIG. 8 is a flow chart illustrating another exemplary process for determining a first pixel distance between an object in two adjacent images according to some embodiments of the present disclosure. The process 800 may be executed by the security screening system 100. For example, the process 800 may be implemented as a set of instructions stored in the storage ROM 230 or RAM 240. The processor 220 and/or the modules/units in FIGS. 4 and 5 may execute the set of instructions, and when executing the instructions, the processor 220 and/or the modules/units may be configured to perform the process 800. The operations of the illustrated process presented below are intended to be illustrative. In some embodiments, the process 800 may be accomplished with one or more additional operations not described and/or without one or more of the operations discussed. Additionally, the order in which the operations of the process 800 as illustrated in FIG. 8 and described below is not intended to be limiting.

In 801, the acquisition unit 510 may obtain a first plurality of images and acquire two images from the first plurality of images. In some embodiments, the first plurality of images may be captured by the security screening equipment 110 in a temporal sequence. For example, when a luggage is located on the conveyor belt 113, the luggage may be transmitted to an internal cavity of the security screening equipment 110. When the luggage is moving on the conveyor belt 113, the security screening equipment 110 may capture a video including the first plurality of images according to a first frame rate set by a user. In some embodiments, each of the first plurality of images may relating to an object. For example, each of the first plurality of images may include at least part of the object.

In some embodiments, the acquisition unit 510 may obtain the first plurality of images from the security screening equipment 110 and transmit the first plurality of images to a storage (e.g., the storage device 140, the terminal 130, or the storage module 440). In some embodiments, the acquisition unit 510 may obtain the first plurality of images from the storage (e.g., the storage device 140, the terminal 130, or the storage module 440).

The two images acquired by the acquisition unit 510 from the first plurality of images may be any images of the first plurality of images. In some embodiments, the two images may be generated in adjacent time points. For example, the two images may include the first generated image and the second generated image, or the two images may include the third generated image and the fourth generated image. In some embodiments, the two images may be not generated in adjacent time points, e.g., there may be one or more images generated between the two images. For example, the two images may include the first generated image and the fifth generated image, and there may be three images (e.g., the second generated image, the third generated image, the fourth generated image) between the two images. For another example, the two images may include the second generated image and the fourth generated image, and there may be one image (e.g., the third generated image) between the two images.

In some embodiments, the acquisition unit 510 may acquire the two images from the first plurality of images based on a user input via the image processing device 120 or the terminal 130. The user may set a number count of the one or more images generated between the two images in the first plurality of images in the temporal sequence. For example, the user may set the number count of the one or more images generated between the two images in the first plurality of images in the temporal sequence to be 2, and the acquisition unit 510 may acquire the first generated image and the fourth generated image of the first plurality of images.

In some embodiments, the acquisition unit 510 may acquire the two images based on a first frame rate of the image captured by the security screening equipment 110 and a second frame rate. The first frame rate and the second frame rate may be set by a user via the image processing device 120 or the terminal 130. In some embodiments, the user may set the first frame rate to 60 fps, and set the second frame rate to 15 fps, thus the acquisition unit 510 may acquire one image for every four images of the plurality of images. For example, the security screening equipment 110 may capture the first plurality of images in a temporal sequence every 16.67 ms, and the acquisition unit 510 may acquire the two images including the first generated image and the fifth generated image of the first plurality images in the temporal sequence.

In 802, the analysis unit 520 may determine two processed images based on the two images acquired by the acquisition unit 510. The two processed images including a first processed image determined and a second processed image. The analysis unit 520 may determine the first processed image by performing smart algorithm analysis on a first image of the two images, and determine the second processed image by performing the smart algorithm analysis on a second image of the two images. As used herein, the first image of the two images may be generated earlier than the second image. As described in the present disclosure, the first plurality of images may be captured in a temporal sequence according to a first frame rate. Details of generating a processed image may be described elsewhere in the present disclosure. See, e.g., FIG. 6 and the descriptions thereof. The processed image may include the image and information relating to the object in the image. The information relating to the object may include the one or more pixels of the object and the coordinate of the object in the image.

Figure 13:
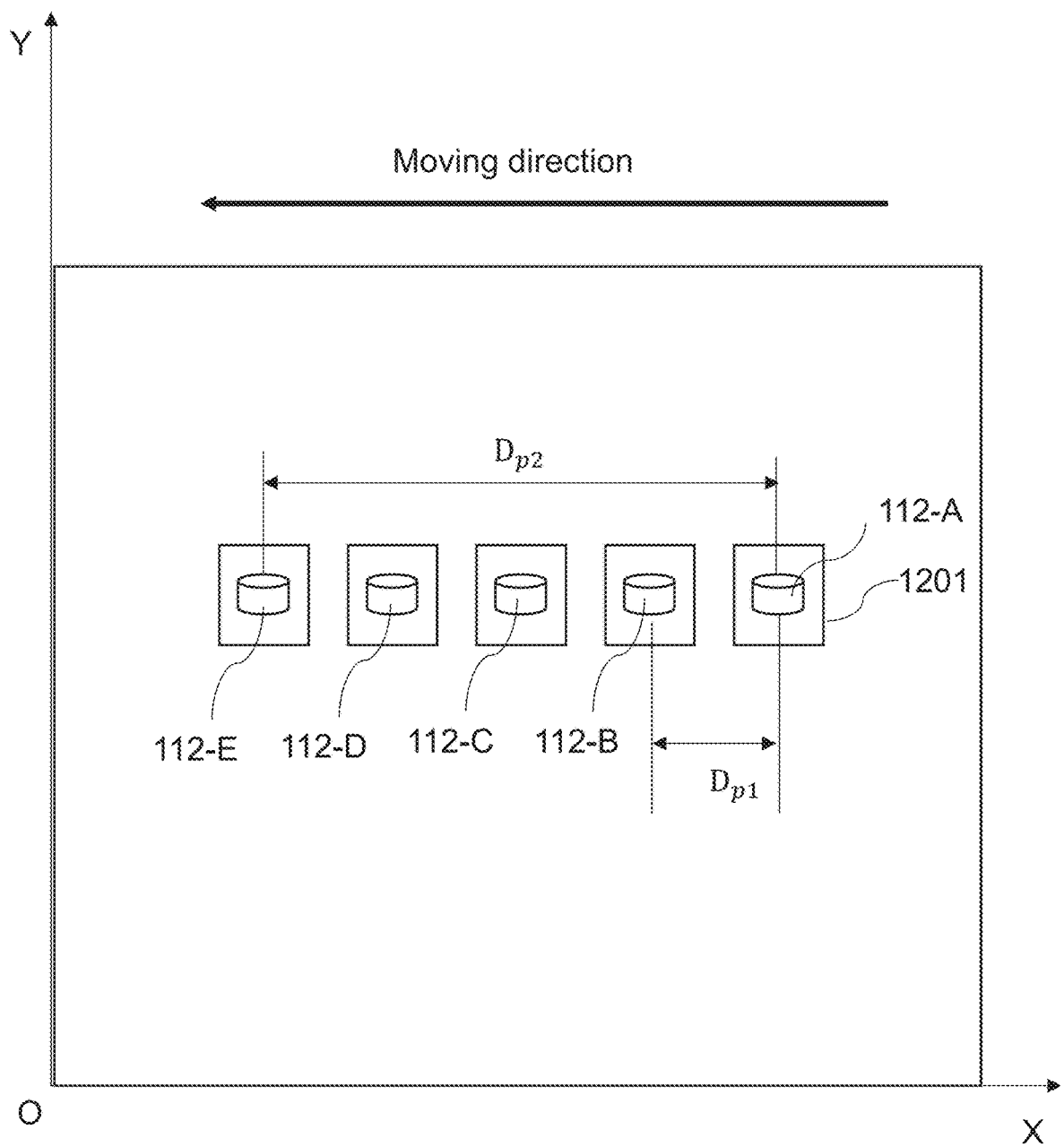
FIG. 13 is a schematic diagram illustrating determination of the first pixel distance between an object in two adjacent images according to some embodiments of the present disclosure.

For example, as illustrated in FIG. 13, five temporal images of the first plurality of images are overlapping with each other. The object 112-A is in the first generated image of the five temporal images; the object 112-B is in the second generated image of the five temporal images; the object 112-C is in the third generated image of the five temporal images; the object 112-D is in the fourth generated image of the five temporal images; the object 112-E is in the fifth generated image of the five temporal images. It should be noted that the objects 112-A, 112-B, 112-C, 112-D, 112-E is the same object 112, and the coordinate of the object 112 in each of the five temporal images may be different from each other due to movement of the object 112 located on the conveyor belt 113. The acquisition unit 510 may acquire the two images including the first generated image including the object 112-A of the five temporal images and the fifth generated image including the object 112-E of the five temporal images. The first processed image may include the first coordinate of the object 112-A in the first image (i.e., the first generated image of the five temporal images), and the second processed image may include the second coordinate of the object 112-E in the second image (i.e., the fifth generated image of the five temporal images).

In 803, the distance determination unit 530 may determine a second pixel distance between the object in the first image of the two images and the object in the second image of the two images. In some embodiments, as shown in FIG. 13, the first processed image may include the first coordinate of the object 112-A in the first image (i.e., the first generated image of the five temporal images), and the second processed image may include the second coordinate of the object 112-E in the second image (i.e., the fifth image of the five temporal images). The distance determination unit 530 may determine the second pixel distance based on the first coordinate of the object in the first image and the second coordinate of the object in the second image. For example, as illustrated in FIG. 13, the distance determination unit 530 may determine the second pixel distance $D_{p2}$.

In some embodiments, the second pixel distance may be a number count of pixels along one or more directions. In some embodiments, the one or more directions may include an X-axis direction parallel to the moving direction of the object or the conveyor belt 113. In some embodiments, the one or more directions may include a Y-axis direction perpendicular to the moving direction of the object or the conveyor belt 113. For example, if the first coordinate of the object in the first image is (200, 100), and the second coordinate of the object in the second image is (120, 100), the distance determination unit 530 may determine that the second pixel distance is 80 pixels along the X-axis direction parallel to the moving direction of the object. For another example, if the first coordinate of the object in the first image is (200, 100), and the second coordinate of the object in the second image is (120, 96), the distance determination unit 530 may determine that the second pixel distance is 80 pixels along the X-axis direction parallel to the moving direction of the object and 4 pixels along the Y-axis direction perpendicular to the moving direction of the object.

In 804, the distance determination unit 530 may determine a number count of images between the first image and the second image of the two images. In some embodiments, the number count of the images between the first image and the second image of the two images may be set by the user in 801. For example, the number count of images between the two images may be 0, 1, 2, . . . etc. In some embodiments, the number count of the images between the first image and the second image of the two images may be determined by the distance determination unit 530 based on the first frame rate and the second frame rate. For example, if the first frame rate is 60 fps, and the second frame rate is 15 fps, the distance determination unit 530 may determine that the number count of the one or more images between the first image and the second image of the two images is 3.

In 805, the distance determination unit 530 may determine the first pixel distance between the object in two adjacent images of the first plurality of images based on the second pixel distance and the number count of the one or more images between the two images. In some embodiments, the first pixel distance between the object in any two adjacent images of the plurality of images may be the same. The distance determination unit 530 may determine the first pixel distance based on the formula below:

$$D_{p1} = \frac{D_{p2}}{n+1}, \quad (1)$$

where $D_{p1}$ is the first pixel distance between the object in two adjacent images of the first plurality of images, $D_{p2}$ is the second pixel distance between the object in the first image and the object in the second image of the two images, n is the number count of the one or more images between the two images. For example, if the number count of the one or more images between the two images is 0, e.g., the two images may be generated in adjacent time points, then the distance determination unit 530 may determine that the first pixel distance is the same with the second pixel distance.

It should be noted that the above description of process 800 is merely provided for the purposes of illustration, and not intended to be understood as the only embodiment. For persons having ordinary skills in the art, various variations and modifications may be conduct under the teaching of some embodiments of the present disclosure. In some embodiments, some operations may be reduced or added. However, those variations and modifications may not depart from the protecting of some embodiments of the present disclosure. For example, one or more other optional operations (e.g., a storing operation) may be added in the process 800. In the storing operation, the image processing device 120 may store information and/or data associated with the first pixel distance, or the second pixel distance in a storage device (e.g., the storage device 140, the storage module 440, the storage 390) as described elsewhere in the present disclosure.

Figure 9:
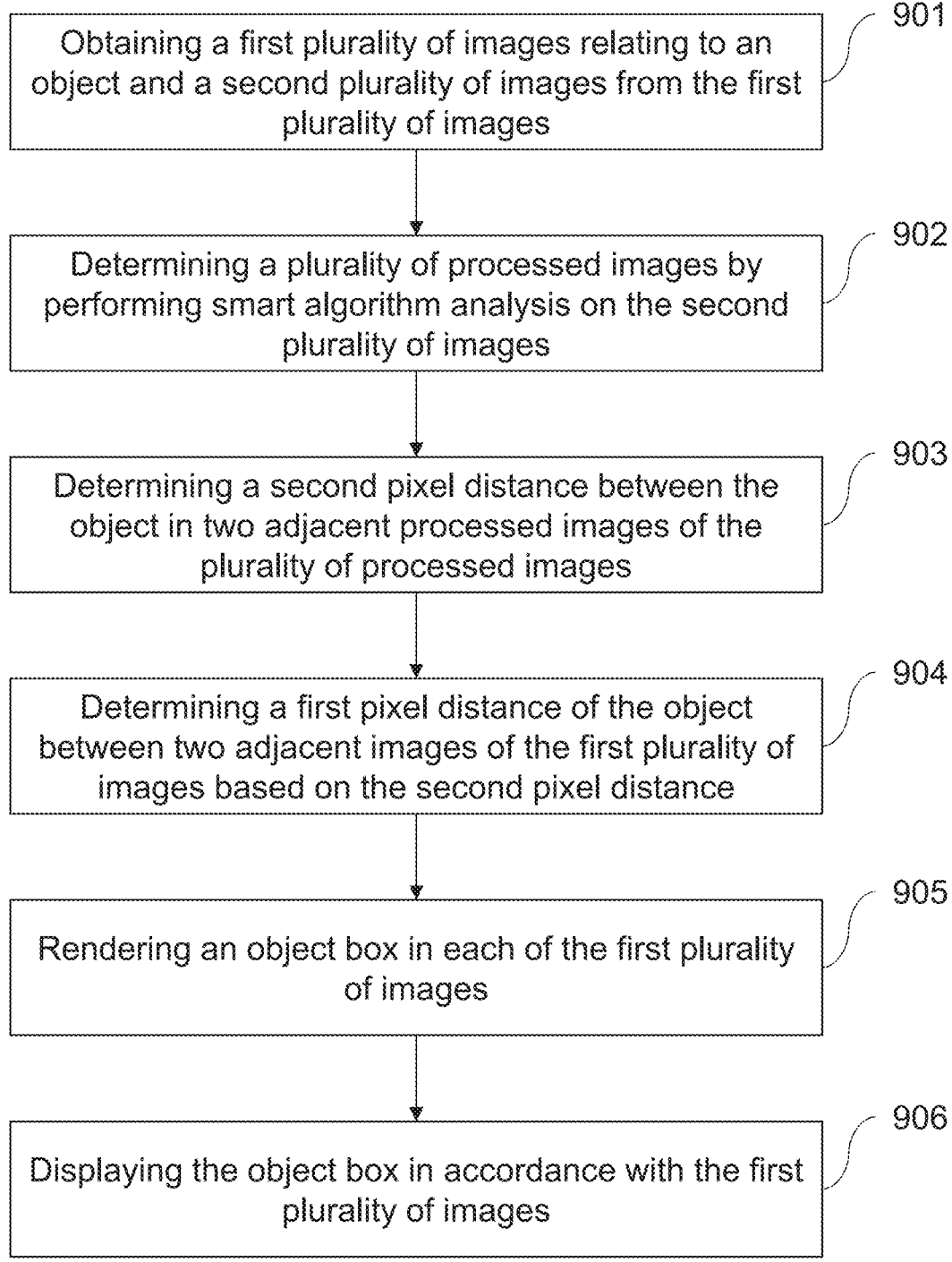
FIG. 9 is a flow chart illustrating another exemplary process for rendering object boxes according to some embodiments of the present disclosure.

FIG. 9 is a flow chart illustrating another exemplary process for rendering object boxes according to some embodiments of the present disclosure. The process 900 may be executed by the security screening system 100. For example, the process 900 may be implemented as a set of instructions stored in the storage ROM 230 or RAM 240. The processor 220 and/or the modules/units in FIGS. 4 and 5 may execute the set of instructions, and when executing the instructions, the processor 220 and/or the modules/units may be configured to perform the process 900. The operations of the illustrated process presented below are intended to be illustrative. In some embodiments, the process 900 may be accomplished with one or more additional operations not described and/or without one or more of the operations discussed, Additionally, the order in which the operations of the process 900 as illustrated in FIG. 9 and described below is not intended to be limiting.

In 901, the acquisition unit 510 may obtain a first plurality of images and acquire a second plurality of images from the first plurality of images. In some embodiments, the first plurality of images may be captured by the security screening equipment 110 in a temporal sequence according to a first frame rate. For example, when a luggage is located on the conveyor belt 113, the luggage may be transmitted to an internal cavity of the security screening equipment 110. When the luggage is moving on the conveyor belt 113, the security screening equipment 110 may capture a video including the first plurality of images according to the first frame rate set by a user. In some embodiments, each of the first plurality of images may relating to an object. For example, each of the first plurality of images may include at least part of the object.

In some embodiments, the acquisition unit 510 may acquire the second plurality of images from the first plurality of images according to a second frame rate set by the user. The second plurality of images may include at least two images. The acquisition unit 510 may also acquire the second plurality of images from the first plurality of images in a temporal sequence.

In some embodiments, the first image of the second plurality of images may be the first image of the plurality of image. For example, if the first frame rate is set to be 60 fps, and the second frame rate is set to be 15 fps, the security screening equipment 110 may capture the first plurality of images in a temporal sequence every 16.67 ms, and the acquisition unit 510 may acquire the second plurality of images including the first generated image, the fifth generated image, the ninth generated image, . . . of the first plurality of images in the temporal sequence.

In some embodiments, the first image of the second plurality of images may not be the first generated image of the first plurality of image. For example, if the first frame rate is set to be 60 fps, and the second frame rate is set to be 15 fps, the security screening equipment 110 may capture the first plurality of images in a temporal sequence every 16.67 ms, and the acquisition unit 510 may acquire the second plurality of images including the second generated image, the sixth generated image, the tenth generated image, . . . of the first plurality of images in the temporal sequence.

In some embodiments, the acquisition unit 510 may transmit the first plurality of images and the second plurality of images to a storage (e.g., the storage device 140, the terminal 130, the storage module 440, or the storage 390). In some embodiments, the acquisition unit 510 may obtain the first plurality of images from the storage (e.g., the storage device 140, the terminal 130, the storage module 440, or the storage 390).

In 902, the analysis unit 520 may determine a plurality of processed images based on the second plurality of images by performing smart algorithm analysis on each of the second plurality of images. Each processed image of the plurality of processed images may correspond an image of the second plurality of images and an image of the first plurality of images. As described elsewhere in the present disclosure, the second plurality of images may be in a temporal sequence. The first image of the second plurality of images may be the first generated image of the first plurality of images, and may be processed by the analysis unit 520 to determine a first processed image, similarly to the description in operation 602. The second image of the second plurality of images may be the fifth generated image of the first plurality of images. For example, if the first frame rate is set to be 60 fps, and the second frame rate is set to be 15 fps, the acquisition unit 510 may acquire the second plurality of images including the first generated image, the fifth generated image, the ninth generated image, . . . of the first plurality of images in the temporal sequence, and the second image of the second plurality of images may be the fifth generated image of the first plurality of images. Details of the determination the processed image may be described elsewhere in the present disclosure. See, e.g., FIG. 6 and the descriptions thereof.

A processed image of the plurality of processed images may include a corresponding image of the second plurality of images and information relating to an object identified in the corresponding image, wherein the information relating to the object may include one or more pixels of the object in the corresponding image and a coordinate of the object in the corresponding image. It should be noted that the one or more pixels of the object in the corresponding image may be interchangeably used with one or more pixels of the object in the processed image, and the coordinate of the object in the corresponding image may be interchangeably used with a coordinate of the object in the processed image.

In 903, the distance determination unit 530 may determine a second pixel distance between the object in two adjacent processed images of the plurality of processed images. In some embodiments, the plurality of processed images may include N processed images, where N is an integer and larger than 1, and may include N−1 sets of two adjacent processed images. It should be noted that a set of two adjacent processed images may correspond to a set of two adjacent images of the second plurality of images. And there may be one or more images between the two adjacent images of the second plurality of images in the first plurality of images. For example, the set of two adjacent processed images may include the first processed image corresponding to the first image of the second plurality of images, i.e., the first generated image of the first plurality of images, and the second processed image corresponding to the second image of the second plurality of images, i.e., the fifth generated image of the first plurality of images. Therefore, there are three images (the second generated image, the third generated image, the fourth generated image) between the two adjacent images of the second plurality of images in the first plurality of images.

The distance determination unit 530 may determine the second pixel distance between the object in the set of two adjacent processed images. In some embodiments, the distance determination unit 530 may determine N−1 second pixel distances between the object in the N−1 set of two adjacent processed images. It should be noted that the second pixel distance between the object in two adjacent processed images of the plurality of processed images may be interchangeably used as a second pixel distance between the object in two adjacent images of the second plurality of images. As used herein, the two adjacent processed images may be any two adjacent processed images corresponding to any two adjacent images of the second plurality of images. For example, the two adjacent processed images may include the first processed image corresponding to the first image of the second plurality of images, which is the first generated image of the first plurality of images, and the second processed image corresponding to the second image of the second plurality of images, which is the fifth generated image of the first plurality of images. For another example, the two adjacent processed images may include the second processed image corresponding to the second image of the second plurality of images, which is the fifth generated image of the first plurality of images, and the third processed image corresponding to the third image of the second plurality of images, which is the ninth generated image of the first plurality of images.

In some embodiments, the two adjacent processed images may include the first processed image and the second processed image. The first processed image may include a first coordinate of the object in the first image of the second plurality of images, and the second processed image may include a second coordinate of the object in the second image of the second plurality of images. The distance determination unit 530 may determine the second pixel distance between the object in the two adjacent processed images (e.g., the first processed image and the second processed image) based on the first coordinate of the object in the first image of the second plurality of images and the second coordinate of the object in the second image of the second plurality of images.

In some embodiments, the second pixel distance may be a number count of pixels along one or more directions. In some embodiments, the one or more directions may include an X-axis direction parallel to the moving direction of the object or the conveyor belt 113. In some embodiments, the one or more directions may include a Y-axis direction perpendicular to the moving direction of the object or the conveyor belt 113. For example, as illustrated in FIG. 13, if the first coordinate of the object 112-A in the first processed image of the second plurality of images (i.e., the first generated image of the first plurality of images) is (200, 100), and the second coordinate of the object 112-E in the second image of the second plurality of images (i.e., the fifth generated image of the first plurality of images) is (120, 100), the distance determination unit 530 may determine that the second pixel distance $D_{p2}$ between the object in the first processed image and the object in the second processed image is 80 pixels along the X-axis direction parallel to the moving direction of the object 112. For another example, if the first coordinate of the object 112-A in the first processed image of the second plurality of images (i.e., the first generated image of the first plurality of images) is (200, 100), and the second coordinate of the object 112-E in the second image of the second plurality of images (i.e., the fifth generated image of the first plurality of images) is (120, 96), the distance determination unit 530 may determine that the second pixel distance between the object in the first processed image and the object in the second processed image is 80 pixels along the X-axis direction parallel to the moving direction of the object and 4 pixels along the Y-axis direction perpendicular to the moving direction of the object.

In 904, the distance determination unit 530 may determine a first pixel distance between the object in two adjacent images of the first plurality of images based on the second pixel distance. In some embodiments, the two adjacent images may be two images captured by the security screening equipment 110 at two adjacent time points. For example, the two adjacent images may include the first generated image and the second generated image captured by the security screening equipment 110 later than and next to the first generated image. The distance determination unit 530 may determine a set of images of the first plurality of images corresponding to a set of two adjacent processed images of the plurality of processed images. The set of images of the first plurality of images may include two images corresponding to the two adjacent processed images and one or more images between the two images in the first plurality of images. The first generated image of the set of images and the last generated image of the set of images may be processed by the analysis unit 520 to determine processed images, and the other images between the first generated image of the set of images and the last generated image of the set of images may not be processed by the analysis unit 520. This may greatly release the computing burden of the processors and improve the efficiency of the processing, since the smart algorithm analysis may need to a lot of computing resource.

For example, the set of two adjacent processed images may include the first processed image corresponding to the first image of the second plurality of images, i.e., the first generated image of the first plurality of images, and the second processed image corresponding to the second image of the second plurality of images, i.e., the fifth generated image of the first plurality of images. The set of images of the first plurality of images may include the first generated image, the second generated image, the third generated image, the fourth generated image, and the fifth generated image of the first plurality of images. For another example, the set of two adjacent processed images may include the second processed image corresponding to the second image of the second plurality of images, i.e., the fifth generated image of the first plurality of images, and the third processed image corresponding to the third image of the second plurality of images, i.e., the ninth generated image of the first plurality of images. The set of images of the first plurality of images may include the fifth generated image, the sixth generated image, the seventh generated image, the eighth generated image, and the ninth generated image of the first plurality of images.

The first pixel distance may be a number count of pixels along one or more directions. In some embodiments, the one or more directions may include the X-axis direction parallel to the moving direction of the object or the conveyor belt 113. In some embodiments, the one or more directions may include the Y-axis direction perpendicular to the moving direction of the object or the conveyor belt 113. In some embodiments, the first pixel distance between the object in any two adjacent images of the first plurality of images may be the same. In some embodiments, the first pixel distance between the object in two adjacent images of the first plurality of images may be different to each other.

In some embodiments, the distance determination unit 530 may determine the first pixel distance between two adjacent images of the set of images based on the second pixel distance, the first frame rate and the second frame rate set by a user as bellows:

$$D_{p1} = \frac{D_{p2}}{m}, \quad (2)$$

where $D_{p1}$ is the first pixel distance between the object in the two adjacent images of the set of images, $D_{p2}$ is the second pixel distance between the object in the two processed images of the set of processed images, m is a ratio of the first frame rate to the second frame rate.

For example, if the first frame rate is 60 fps, and the second frame rate is 15 fps, the ratio of the first image to the second image may be 4, As illustrated in FIG. 13, the second pixel distance between the object in the two adjacent processed images of the set of processed images (e.g., the first processed image and the second processed image, or the second processed image and the third processed image, etc.) may include four first pixel distances between the object in the two adjacent image of the set of images. The first pixel distance determined based on the formula (2) may be an average first pixel distance of four first pixel distances.

In 905, the rendering unit 540 may render an object box in each of the first plurality of images. In some embodiments, the object box may surround the object identified by the analysis unit 520. In some embodiments, the object box may surround part of the object (e.g. a center of the object) identified by the analysis unit 520. The object box may be displayed in accordance with the first plurality of images. In some embodiments, the object box may be configured to remind a user (e.g., security staff) that there is a dangerous thing (the object) in a luggage.

In some embodiments, the rendering unit 540 may render the object box in each of the first plurality of images based on a coordinate of the object in the image processed by the analysis unit 520 and/or the first pixel distance between two adjacent images of the first plurality of images. In some embodiments, for each image of the second plurality of images, the rendering unit 540 may render the object box based on the coordinate of the object in the image; for each image of the first plurality of images other than the second plurality of images, the rendering unit 540 may render the object box based on the coordinate of the object in an image of the second plurality of images and the first pixel distance.

For example, for each set of images of the first plurality of images, the first generated image of the set of images and the last generated image of the set of images may be processed by the analysis unit 520 to determine processed images, which include the information of the coordinate of the object in the image, and the other images between the first generated image of the set of images and the last generated image of the set of images may not be processed by the analysis unit 520. The rendering unit 540 may determine a coordinate of the object in each of the other images between the first generated image of the set of images and the last generated image of the set of images based on the coordinate of the object in the first generated image of the set of images and the first pixel distance. The rendering unit 540 may then render the object box in each image of the set of images based on the coordinate of the object in the image. Details of the rendering the object box may be described in the present disclosure. See, e.g., FIG. 10 and the descriptions thereof.

In 906, the display module 430 may display the object box in accordance with the image. In some embodiments, the display module 430 may display the image and the object box simultaneously. In some embodiments, the display module 430 may display the first plurality of images and the object box in each of the first plurality of images according to the first frame rate. For example, the display module 430 may display an image once a time and display 60 images per second. In some embodiments, the security screening equipment 110 may be configured to capture a video including the first plurality of images according to the first frame rate, and the display module 430 configured to display the video including the first plurality of images and the corresponding object box in each of the first plurality of images according to the first frame rate. In some embodiments, the display module 430 may display the first plurality of images and the object box in each of the first plurality of images according to a third frame rate set by a user. The third frame rate may be different with the first frame rate. For example, the third frame rate may larger than the first frame rate or less than the first frame rate.

It should be noted that the above description of process 900 is merely provided for the purposes of illustration, and not intended to be understood as the only embodiment. For persons having ordinary skills in the art, various variations and modifications may be conduct under the teaching of some embodiments of the present disclosure. In some embodiments, some operations may be reduced or added. However, those variations and modifications may not depart from the protecting of some embodiments of the present disclosure. For example, one or more other optional operations (e.g., a storing operation) may be added in the process 900. In the storing operation, the image processing device 120 may store information and/or data associated with the plurality of images, the processed image in a storage device (e.g., the storage device 140, the storage module 440, or the storage 390) as described elsewhere in the present disclosure.

Figure 10:
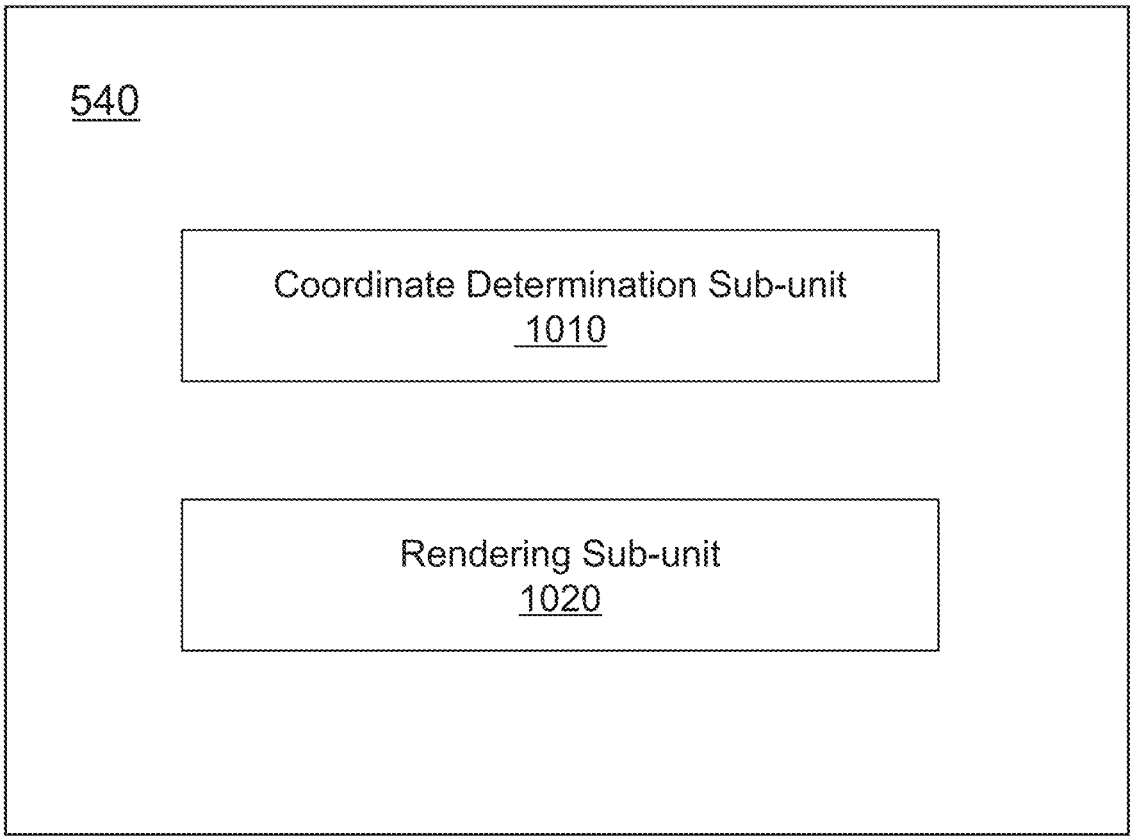
FIG. 10 is a block diagram of an exemplary rendering unit according to some embodiments of the present disclosure.

FIG. 10 is a block diagram of an exemplary rendering unit according to some embodiments of the present disclosure. As illustrated in FIG. 10, the rendering unit 540 may include a coordinate determination sub-unit 1010, and a rendering sub-unit 1020.

The coordinate determination sub-unit 1010 may be configured to determine a second coordinate of an object and/or an object box in an image. In some embodiments, the rendering unit 540 may obtain a first plurality of images captured by the security screening equipment 110 in a temporal sequence. The analysis unit 520 may process at least one image of the first plurality of images to determine a processed image. The at least one image of the first plurality of images may include the first generated image of the first plurality of images. The processed image may include a first coordinate of the object in the at least one image. In some embodiments, the coordinate determination sub-unit 1010 may be configured to determine the second coordinate of the object in the image which is not processed by the analysis unit 520 based on the first coordinate of the object in a previously generated image which is processed by the analysis unit 520, a first pixel distance between the object in two adjacent images of the first plurality of images, and a number count of images generated between the image and the previously generated image which is processed by the analysis unit 520. As used herein, the first coordinate of the object in an image may refer to a coordinate of the object in the image which is processed and determined by the analysis unit 520, and the second coordinate of the object in an image may refer to a coordinate of the object in the image which is determined by the coordinate determination sub-unit 1010, wherein the image is not processed by the analysis unit 520.

In some embodiments, as illustrated in FIG. 13, the image including the object 112-B may not be processed by the analysis unit 520, and the previously generated image including the object 112-A may be processed by the analysis unit 520. For example, the first coordinate of the object 112-A in the previously generated image may be determined by the analysis unit 520 as (200,100), the first pixel distance may be 20 along the negative X-axis direction, and the number count of images generated between the image and the previously generated image is 0. The coordinate determination sub-unit 1010 may determine that the second coordinate of the object 112-B in the image as (180, 100). For another example, the first coordinate of the object 112-A in the previously generated image may be determined by the analysis unit 520 as (200,100), the first pixel distance may be 20 along the negative X-axis direction and 1 along the negative Y-axis direction, and the number count of images generated between the image and the previously generated image is 0. The coordinate determination sub-unit 1010 may determine that the second coordinate of the object 112-B as (180, 99).

The rendering sub-unit 1020 may be configured to render an object box in an image based on a coordinate of the object in the image. The object box may surround the object. The object may be a knife, a gun, a cigarette lighter, or the like, and may have various shapes. In some embodiments, the object box may have a regular shape as the same with the shape of the identified object. In some embodiments, the object box may have a shape of rectangle, square, triangle, circle, oval, or irregular shape. The rendering sub-unit 1020 may render the object box using a color different from the image for alert, e.g., red, green, yellow, etc. The rendering sub-unit 1020 may further render the object box in a twinkling manner.

In some embodiments, the rendering sub-unit 1020 may render the object box based on the coordinate of the object in the image. In some embodiments, the object box 1201 may include side of the range representing the coordinate of the object 112. In some embodiments, the object box 1201 may surround a region larger than the range representing the coordinate of the object 112. For example, the range representing the coordinate of the object 112 may be a rectangle region defined by $(X_{min}, X_{max}, Y_{min}, Y_{max})$, and the object box 1201 may be a rectangle defined by $(X_{min}-N_{x1}, X_{max}+N_{x2}, Y_{min}-N_{Y1}, Y_{max}+N_{Y2})$, wherein $N_{x1}, N_{x2}, N_{Y1}, N_{Y2}$ may be any integer respectively. For example, the range representing the coordinate of the object 112 may be a square region defined by center point $(X_A, Y_A)$ and side-length $L=2*D_{max}$, or a circle region defined by center point $(X_A, Y_A)$ and the radius $D_{max}$, and the object box 1201 may be a circle defined by the center point $(X_A, Y_A)$ and a radius $D_{max}+D$, wherein D may be any integer.

Sub-units of the rendering unit 540 may be connected to or communicate with each other via a wired connection or a wireless connection. The wired connection may include a metal cable, an optical cable, a hybrid cable, or the like, or any combination thereof. Two or more of the sub-units may be combined into a single sub-unit, and any one of the sub-units may be divided into two or more blocks. For example, the coordinate determination sub-unit 1010 and the rendering sub-unit 1020 may be combined into a single unit that may be configured to determine the coordinate of the object in the image and render the object box in the image.

FIG. 11A illustrates a schematic image captured by the security screening system according to some embodiments of the present disclosure. In some embodiments, the security screening equipment 110 may capture a first plurality of images in a temporal sequence when the luggage located on the conveyor belt 113 is moving. The image may be an image of the first plurality of images including an object 112. It should be noted that an imaging range of the security screening equipment 110 may be fixed while the luggage is moving on the conveyor belt 113, resulting that the position of the luggage in the first plurality of image may be various. For example, the coordinate of the object 112 in the first plurality of image may be various.

FIG. 11B illustrates a schematic processed image determined by the security screening system based on the image shown in FIG. 11A according to some embodiments of the present disclosure. In some embodiments, the analysis unit 520 may process the image as illustrated in FIG. 11A, and determine a processed image as illustrated in FIG. 11B. The processed image may include information relating to the object 112. The information relating to the object 112 may include one or more pixels of the object 112 and the coordinate of the object 112 in the image.

FIG. 12 illustrates a schematic image shown in FIG. 11A and the object box displayed on a screen according to some embodiments of the present disclosure. It should be noted that an imaging range of the security screening equipment 110 may be fixed while the luggage is moving on the conveyor belt 113, resulting that the position of the luggage and the coordinate of the object 112 in the image of the first plurality of image may be various. The object box 1201 may also be rendered on different position in the image according to the coordinate of the object 112 and displayed in accordance with the image on the screen simultaneously. The object box 1201 may rendered using a color different from the image for alert, e.g., red, green, yellow, etc. The object box 1201 may be rendered and displayed in a twinkling manner.

FIG. 13 is a schematic diagram illustrating determination of the first pixel distance between an object in two adjacent images according to some embodiments of the present disclosure. As illustrated in FIG. 13, five temporal images of the first plurality of images are overlapping with each other. The object 112-A is in the first generated image of the five temporal images; the object 112-B is in the second generated image of the five temporal images; the object 112-C is in the third generated image of the five temporal images; the object 112-D is in the fourth generated image of the five temporal images; the object 112-E is in the fifth generated image of the five temporal images. It should be noted that the objects 112-A, 112-B, 112-C, 112-D, 112-E is the same object 112, and the coordinate of the object 112 in each of the five temporal images may be different with each other due to the movement of the object 112 located on the conveyor belt 113 along the direction of negative X-axis direction. In order to release the computing burden of the processors and improve the efficiency of the processing, the processing module 420 may acquire the first generated image of the five temporal images and the fifth generated image of the five temporal images to process. The processing module 420 may determine a first coordinate of the object 112-A in the first generated image, and determine a first coordinate of the object 112-E in the fifth generated image. The processing module 420 may determine a second pixel distance $D_{p2}$ between the object 112 in two adjacent processed images based on the first coordinate of the object 112-A in the first generated image and the first coordinate of the object 112-E in the fifth generated image. The processing module 420 may further determine a first pixel distance based on the second pixel distance and a number count of images between the two adjacent processed images (e.g., the first generated image and the fifth generated image). The processing module 420 may determine a second coordinate of the object 112 in the images between the two adjacent processed images.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE. Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed object matter requires more features than are expressly recited in each claim. Rather, claim object matter lie in less than all features of a single foregoing disclosed embodiment.

I claim:

1. A system, comprising:
   at least one storage medium including a set of instructions; and
   at least one processor in communication with the at least one storage medium, wherein when executing the set of instructions, the at least one processor effectuates operations comprising:
      obtaining a plurality of images, in a temporal sequence, each of the plurality of images relating to an object;
      obtaining a first processed image by performing a smart algorithm analysis on a first image in the plurality of images, the smart algorithm analysis including identifying the object in the first image and determining a first coordinate of the object in the first image;
      determining a first pixel distance between the object in two adjacent images in the plurality of images; and
      rendering an object box for the object in each of the plurality of images for display based on the first coordinate of the object in the first image and the first pixel distance;
      wherein in determining the first pixel distance between the object in two adjacent images, the at least one processor effectuates further operations comprising:
         acquiring a second image from the plurality of images, wherein there is one or more images between the first image and the second image;
         determining a second processed image by perform the smart algorithm analysis on the second image;
         determining a second pixel distance between the object in the first image and the object in the second image based on the first coordinate of the object in the first image and a second coordinate of the object in the second image;
         determining a number count of the one or more images between the first image and the second image; and
         determining the first pixel distance based on the second pixel distance and the number count of the one or more images between the first image and the second image.

2. The system of claim 1, further comprising an image capture device, wherein the plurality of images are obtained from a video captured by the image capture device.

3. The system of claim 1, wherein the number count of the one or more images between the first image and the second image is determined based on a first frame rate of the video and a second frame rate of processed image, the first frame rate and the second frame rate being preset by a user.

4. The system of claim 1, wherein in rendering an object box in each of the plurality of images, the at least one processor effectuates further operations comprising:
   determining a third coordinate of the object in each of the one or more images between the first image and the second image based on the first coordinate of the object in the first image and the first pixel distance;
   rendering an object box in the first image based on the first coordinate of the object in the first image;
   rendering an object box in each of the one or more images between the first image and the second image based on the third coordinate; and
   rendering an object box in the second image based on the second coordinate of the object in the second image.

5. The system of claim 1, wherein in rendering an object box in each of the plurality of images, the at least one processor effectuates further operations comprising:
   determining a fourth coordinate of the object in each of the plurality of images other than the first image based on the first coordinate of the object in the first image and the first pixel distance;
   rendering an object box in the first image based on the first coordinate of the object in the first image; and
   rendering an object box in each of the plurality of images other than the first image based on the fourth coordinate of the object.

6. The system of claim 1, wherein a shape of the object box includes one of rectangle, square, triangle, circle, oval, or irregular shape.

7. The system of claim 1, wherein a shape of the object box includes a contour of the object.

8. The system of claim 1, wherein the smart algorithm analysis comprising a convolutional neutral network (CNN), Region-based Convolutional Network (R-CNN), Spatial Pyramid Pooling Network (SPP-Net), Fast Region-based Convolutional Network (Fast R-CNN), Faster Region-based Convolutional Network (Faster R-CNN).

9. The system of claim 3, further comprising a screen configured to display the plurality of images and the object box in each of the plurality of images in the temporal sequence.

10. The system of claim 9, wherein the screen displays the plurality of images and the object box according to a third frame rate.

11. A method implemented on at least one machine each of which has at least one processor and a storage device, comprising:
  obtaining, by the at least one processor, a plurality of images in a temporal sequence, each of the plurality of images relating to an object;
  obtaining, by the at least one processor, a first processed image by performing a smart algorithm analysis on a first image in the plurality of images, the smart algorithm analysis including identifying the object in the first image and determining a first coordinate of the object in the first image;
  determining, by the at least one processor, a first pixel distance between the object in two adjacent images in the plurality of images; and
  rendering, by the at least one processor, an object box for the object in each of the plurality of images for display based on the first coordinate of the object in the first image and the first pixel distance;
  wherein the determining the first pixel distance between the object in two adjacent images further comprising:
    acquiring, by the at least one processor, a second image from the plurality of images, wherein there is one or more images between the first image and the second image;
    determining, by the at least one processor, a second processed image by perform the smart algorithm analysis on the second image;
    determining, by the at least one processor, a second pixel distance between the object in the first image and the object in the second image based on the first coordinate of the object in the first image and a second coordinate of the object in the second image;
    determining, by the at least one processor, a number count of the one or more images between the first image and the second image; and
    determining, by the at least one processor, the first pixel distance based on the second pixel distance and the number count of the one or more images between the first image and the second image.

12. The method of claim 11, the at least one machine further comprising an image capture device, wherein the plurality of images are obtained from a video captured by the image capture device.

13. The method of claim 11, wherein the number count of the one or more images between the first image and the second image is determined based on a first frame rate of the video and a second frame rate of processed image, the first frame rate and the second frame rate being preset by a user.

14. The method of claim 11, wherein the rendering an object box in each of the plurality of images further comprising:
  determining, by the at least one processor, a third coordinate of the object in each of the one or more images between the first image and the second image based on the first coordinate of the object in the first image and the first pixel distance;
  rendering, by the at least one processor, an object box in the first image based on the first coordinate of the object in the first image;
  rendering, by the at least one processor, an object box in each of the one or more images between the first image and the second image based on the third coordinate; and
  rendering, by the at least one processor, an object box in the second image based on the second coordinate of the object in the second image.

15. The method of claim 11, wherein the rendering an object box in each of the plurality of images further comprising:
  determining, by the at least one processor, a fourth coordinate of the object in each of the plurality of images other than the first image based on the first coordinate of the object in the first image and the first pixel distance;
  rendering, by the at least one processor, an object box in the first image based on the first coordinate of the object in the first image; and
  rendering, by the at least one processor, an object box in each of the plurality of images other than the first image based on the fourth coordinate of the object.

16. A non-transitory computer-readable medium storing instructions, the instructions, when executed by a computing device including at least one processor, causing the computing device to implement a method, the method comprising:
  obtaining, by the at least one processor, a plurality of images in a temporal sequence, each of the plurality of images relating to an object;
  obtaining, by the at least one processor, a first processed image by performing a smart algorithm analysis on a first image in the plurality of images, the smart algorithm analysis including identifying the object in the first image and determining a first coordinate of the object in the first image;
  determining, by the at least one processor, a first pixel distance between the object in two adjacent images in the plurality of images; and
  rendering, by the at least one processor, an object box for the object in each of the plurality of images for display based on the first coordinate of the object in the first image and the first pixel distance;
  wherein the determining the first pixel distance between the object in two adjacent images further comprising:
    acquiring, by the at least one processor, a second image from the plurality of images, wherein there is one or more images between the first image and the second image;
    determining, by the at least one processor, a second processed image by perform the smart algorithm analysis on the second image;
    determining, by the at least one processor, a second pixel distance between the object in the first image and the object in the second image based on the first coordinate of the object in the first image and a second coordinate of the object in the second image;
    determining, by the at least one processor, a number count of the one or more images between the first image and the second image; and
    determining, by the at least one processor, the first pixel distance based on the second pixel distance and the number count of the one or more images between the first image and the second image.

\* \* \* \* \*